United States Patent
Stack

(10) Patent No.: US 6,636,861 B1
(45) Date of Patent: Oct. 21, 2003

(54) REAL-TIME DATABASE UPLOAD WITH REAL-TIME COLUMN MAPPING

(76) Inventor: David J. Stack, 2920 Jay Ave., Cleveland, OH (US) 44113

(*) Notice: Subject to any disclaimer, the term of this patent is extended or adjusted under 35 U.S.C. 154(b) by 286 days.

(21) Appl. No.: 09/772,674

(22) Filed: Jan. 30, 2001

Related U.S. Application Data

(60) Provisional application No. 60/178,904, filed on Feb. 1, 2000.

(51) Int. Cl.$^7$ .............................................. G06F 17/30
(52) U.S. Cl. ...................... 707/101; 707/10; 707/204; 709/219
(58) Field of Search .................... 707/3, 4, 10, 101, 707/102, 204, 100, 200, 1–5; 705/26; 709/219

(56) References Cited

U.S. PATENT DOCUMENTS

| | | | |
|---|---|---|---|
| 5,727,156 A | | 3/1998 | Herr-Hoyman et al. ...... 709/219 |
| 5,799,284 A | | 8/1998 | Bourquin ...................... 705/26 |
| 5,870,746 A | | 2/1999 | Knutson et al. ............. 707/101 |
| 5,913,032 A | * | 6/1999 | Schwartz et al. ............ 709/213 |
| 6,151,608 A | * | 11/2000 | Abrams ....................... 707/204 |
| 6,205,472 B1 | * | 3/2001 | Gilmour ...................... 709/206 |
| 6,363,392 B1 | * | 3/2002 | Halstead et al. ............. 707/102 |
| 6,377,949 B1 | * | 4/2002 | Gilmour ....................... 707/10 |
| 6,421,669 B1 | * | 7/2002 | Gilmour et al. ................ 707/9 |
| 6,493,717 B1 | * | 12/2002 | Junkin ........................ 707/102 |

* cited by examiner

*Primary Examiner*—Shahid Al Alam
(74) *Attorney, Agent, or Firm*—Benesch Friedlander Coplan & Aronoff, LLP

(57) ABSTRACT

A method of uploading and processing database files of varying file format and column ordering from a client machine to a server machine for storage in a centralized database having a predetermined file format and column ordering is provided. The method includes configuring a database information profile, which includes the file format and column ordering of the database file to be uploaded. Optionally a test upload is performed and upload feedback is received by the client machine. Upon a successful test upload, the database information profile and corresponding database file are uploaded to the server machine. The uploaded database file is parsed line-by-line and column-by-column and mapped into the centralized database in accordance with the fixed format and column ordering of the centralized database.

5 Claims, 5 Drawing Sheets

REAL-TIME DATABASE UPLOAD WITH REAL-TIME COLUMN MAPPING

CROSS REFERENCE TO RELATED PROVISIONAL APPLICATION

This application claims the benefit under 35 U.S.C. 119(e) of U.S. Provisional Application No. 60/178,904 filed Feb. 1, 2000.

BACKGROUND OF THE INVENTION

The present invention relates to software that works in conjunction with electronic hardware. It finds particular application in conjunction with transferring database systems of varying format and column ordering from a client machine to a server machine for insertion into a centralized database. However, it is to be appreciated that the present invention is also amenable to other like applications.

When a business or private seller wants to market a product or service, it advertises the product or service to inform consumers of the availability of the product or service. In the past, such advertisements were limited to certain established media, such as newspapers, magazines, radio, and television. For private sellers of goods and services, these media often limit the scope of information dissemination and may also be cost prohibitive.

With the emergence of Internet technology, many of the above advertising and marketing problems have been eliminated. It is now common to find Internet web sites for the advertising and/or sale of goods by private sellers. Web sites such as ebay® and Amazon.com provide inventory systems where private sellers can list items to be sold and buyers may access information about the goods using key word searches and the like.

Many clients who utilize these "auction" web sites for selling items wish to list a number of items at a given time. Rather than entering each item individually, clients find it useful to transfer a database system containing multiple items to be listed from the client machine or terminal to the server or mainframe centralized database. A transfer of a database system from client to server saves considerable time and effort on the part of the client. Such a database transfer system is illustrated in U.S. Pat. No. 5,799,284 to Bourquin.

Typically, success in transferring a database system from a client machine to a server machine and having the server machine be able to process that database requires that the client send data to the server in a specified database format. Often, this consists of a previously agreed upon singular database format with a predetermined database column ordering. Requiring a predetermined database format forces clients to convert their respective databases to the expected format and column ordering in order to use the uploading process. More particularly, clients must rearrange the order of database columns in order to comply with the server's required format. Converting database formats and rearranging column ordering is undesirable because it is time consuming and often confusing.

Accordingly, the present invention contemplates a new and improved method and system for uploading databases of varying format and column ordering into a centralized database which overcomes the above-referenced problems and others.

SUMMARY OF THE INVENTION

In accordance with one aspect of the present invention, in a computer system in which remote database files having varying formats and column ordering are uploaded from a client machine to a server machine, a method of processing and storing the remote database files into a centralized database having a predetermined file format and column ordering includes receiving and storing a database information profile from the client machine. The database information profile includes at least the file format and column ordering for the remote database file. The remote database file is received from the client machine. The format and column ordering of the remote database file are determined. Data within the received database file is parsed on a row-by-row and column-by-column manner. The parsed data is then mapped into the centralized database in accordance with the predetermined column ordering.

In accordance with a more limited aspect of the present invention, the method further includes verifying the accuracy of the received database information profile.

In accordance with a more limited aspect of the present invention, verifying the accuracy of the received database information profile includes providing the client machine with means to perform a test upload of the remote database system, and providing test upload feedback to the client machine in response to the test upload of the remote database system.

In accordance with another aspect of the present invention, a method for uploading database files of varying format and data organization from a client computer to a server computer for storage within a centralized database, where the centralized database has a predetermined fixed format and data organization, includes configuring a database information profile for transfer to the server computer. The database information profile contains information on the format and data organization of the database file. A test upload of the database information profile and the database file are performed and success feedback is received in response to the test upload. In response to the test upload feedback, either the database information profile is reconfigured to correct errors in the database information profile or the database information profile and the database file are transmitted to the server computer for processing and storage within the centralized database.

In accordance with a more limited aspect of the present invention, upon successful transmission of the database file and the database information profile to the server computer, data within the database file is parsed and mapped into corresponding predetermined columns within the centralized database.

In accordance with another aspect of the present invention, a system in which inventory databases having varying formats and column ordering are transferred from a remote computer system acting as a client to a computer database system acting as a server. The computer database system has a predetermined fixed format and column ordering. The system includes means for receiving a database information profile from the client, where the database information profile contains the format and the column ordering corresponding to the inventory database to be transferred. The database information profile and the inventory database are transferred to the server by means. The system further includes means for parsing data within the inventory database and means for mapping the parsed data into the predetermined column ordering within the computer database system.

In accordance with another aspect of the present invention, a database upload processing program for use in a computer system in which databases having various formats and data organization are uploaded from a peripheral computer to a server computer for storage in a centralized database having a fixed format and data organization is provided. The upload processing program includes means for receiving a database information profile from the peripheral computer, where the database information profile contains information related to the format and data organization of the database to be uploaded. A test upload of the database information profile and the database is performed and corresponding test upload feedback is provided to the peripheral computer. The database information profile and the database are uploaded to the server computer. The data within the uploaded database in parsed, manipulated, and mapped into corresponding predetermined columns within the centralized database in accordance with the fixed format and data organization of the centralized database.

One advantage of the present invention is that it eliminates the need to convert database formats before uploading data into a centralized database.

Another advantage of the present invention is that it eliminates the need to rearrange database column ordering before transferring a database system from a client machine to a server machine.

Another advantage of the present invention resides in the line-by-line and column-by-column parsing and data mapping during uploading.

Yet another advantage of the present invention resides in its test upload feedback feature.

Other benefits and advantages of the present invention will become apparent to those skilled in the art upon a reading and understanding of the preferred embodiment.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
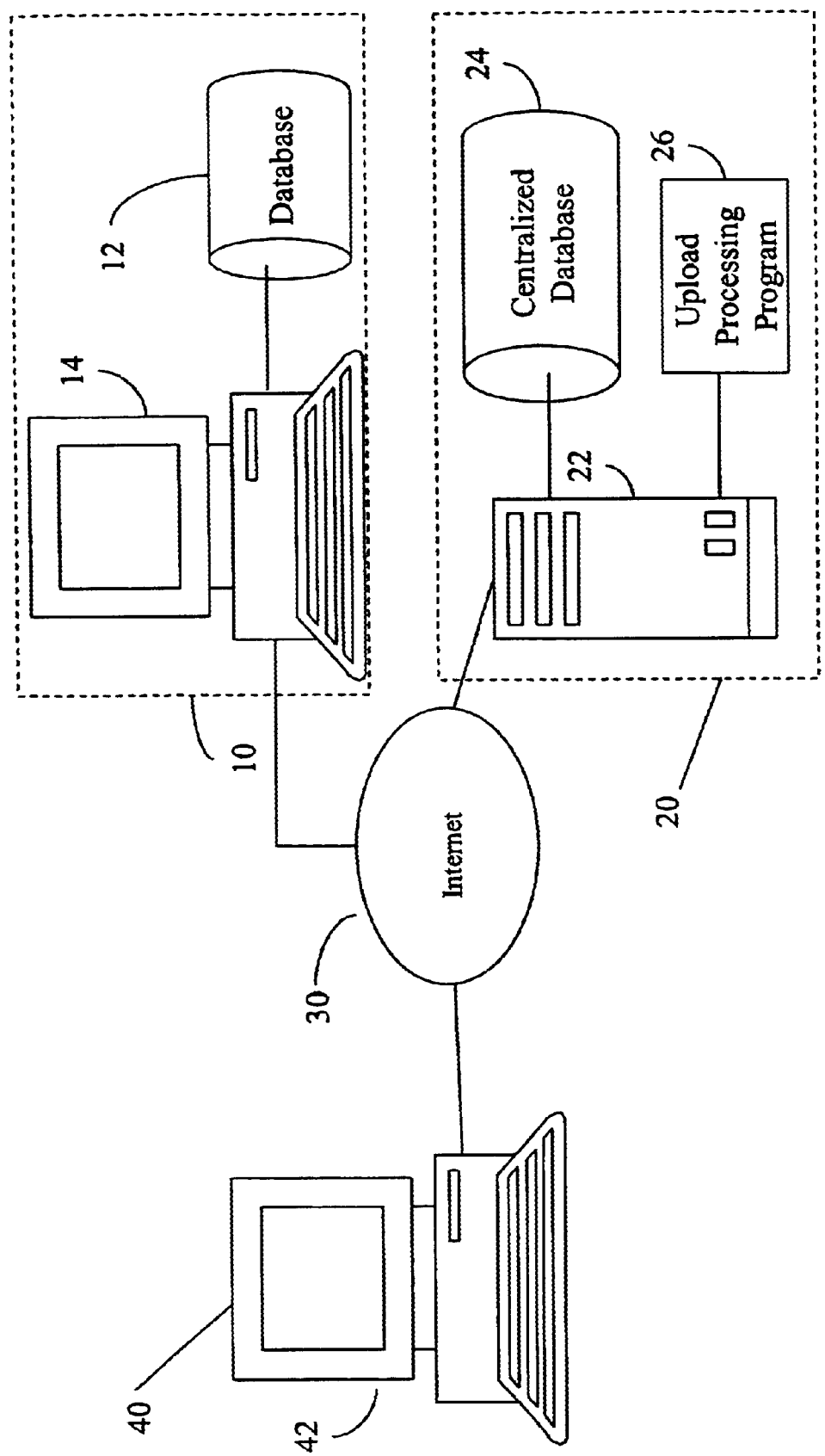
FIG. 1 is a diagrammatic illustration showing Internet-connected participants in an online database transfer in accordance with the present invention.

With reference to FIG. 1, in on-line inventory posting and auctioning or selling of goods, a seller or client 10 transmits or uploads an inventory database 12 from a client machine 14 to a server machine 22 via the Internet 30. The client's inventory database 12 is uploaded onto a server 20 where it is processed and transmitted to a centralized database 24 using an upload processing program 26. Those skilled in the art will appreciate that the centralized database 24 may be connected to the server machine 22 via the Internet 30. A potential buyer 40 gains access to the centralized database 22 over the Internet 30 using a computer 42 with an appropriate web browser or other like software running thereon. It is to be appreciated that the client may transfer the inventory database to the server 20 by downloading the upload processing program 26 and transmitting the inventory database 12 over a simple modem connection where the data will be processed and transferred into the centralized database 24. While the present invention is being described in terms of the upload and processing of an inventory database, it is to be appreciated that it is applicable to the upload and processing of a variety of other databases and data files.

Figure 2A:
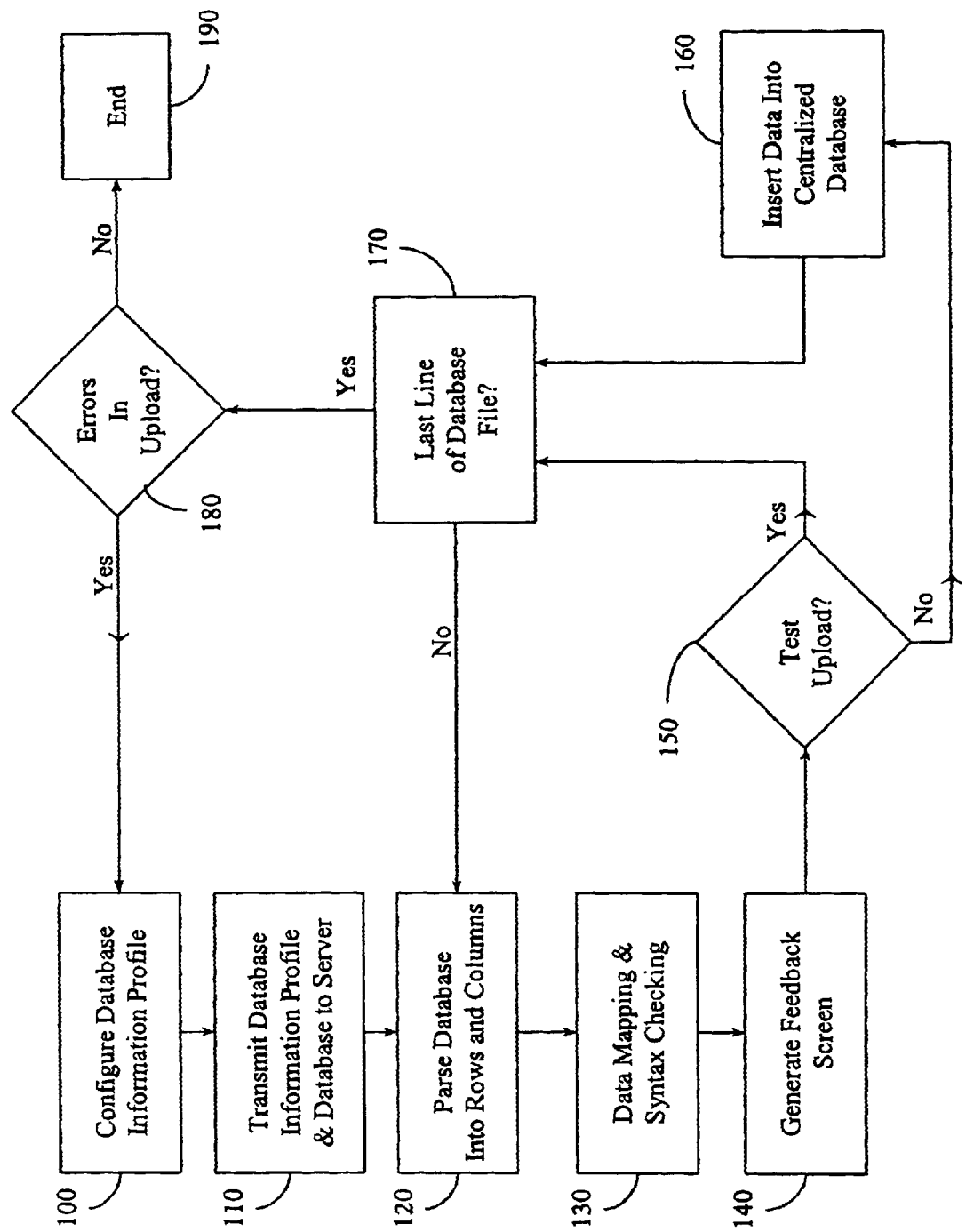
FIG. 2A is a flow chart illustrating an uploading process for transferring databases of varying format and column ordering in accordance with aspects of the present invention.
Figure 2B:
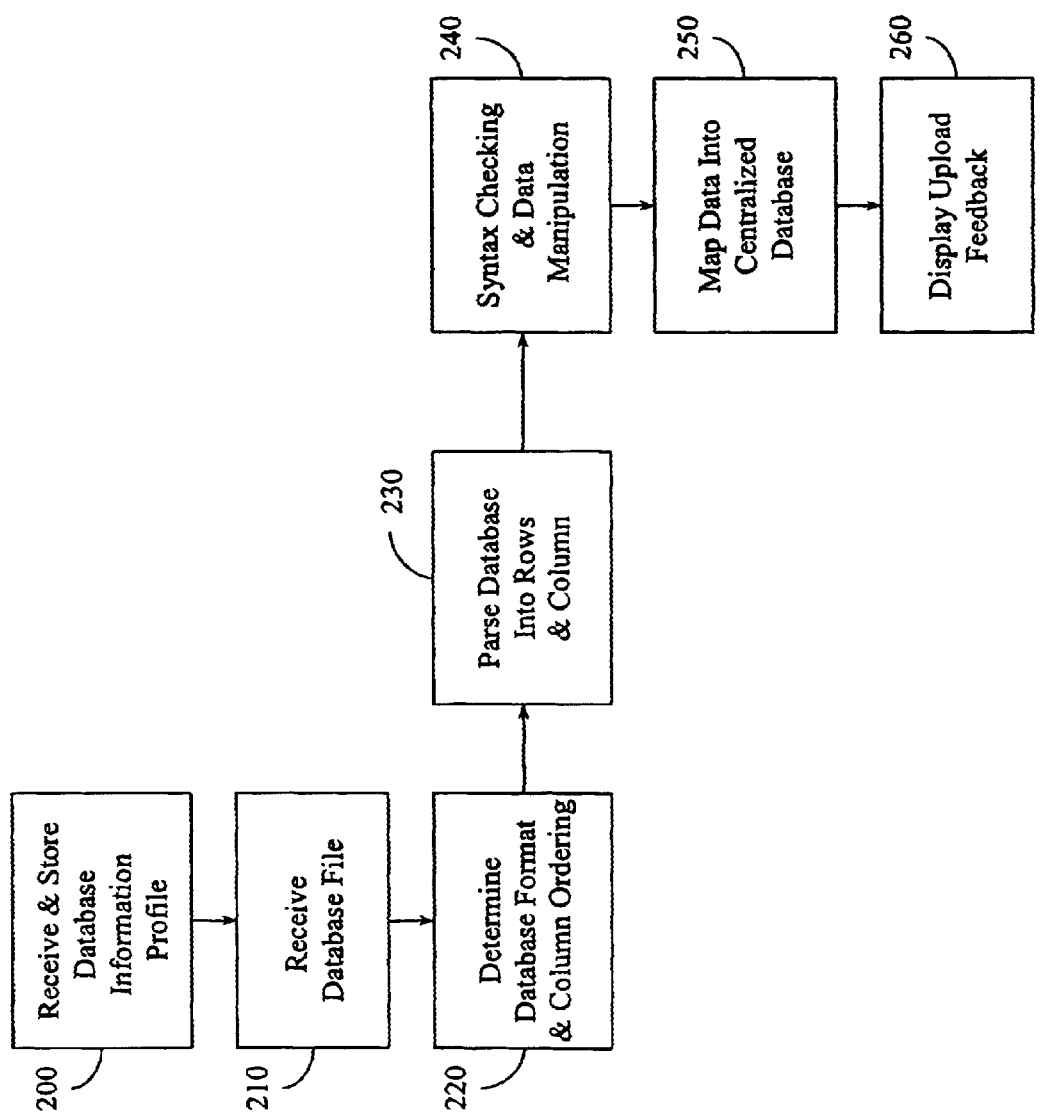
FIG. 2B is a flow chart illustrating a process for receiving database files of varying format and column ordering in accordance with aspects of the present invention.
Figure 3:
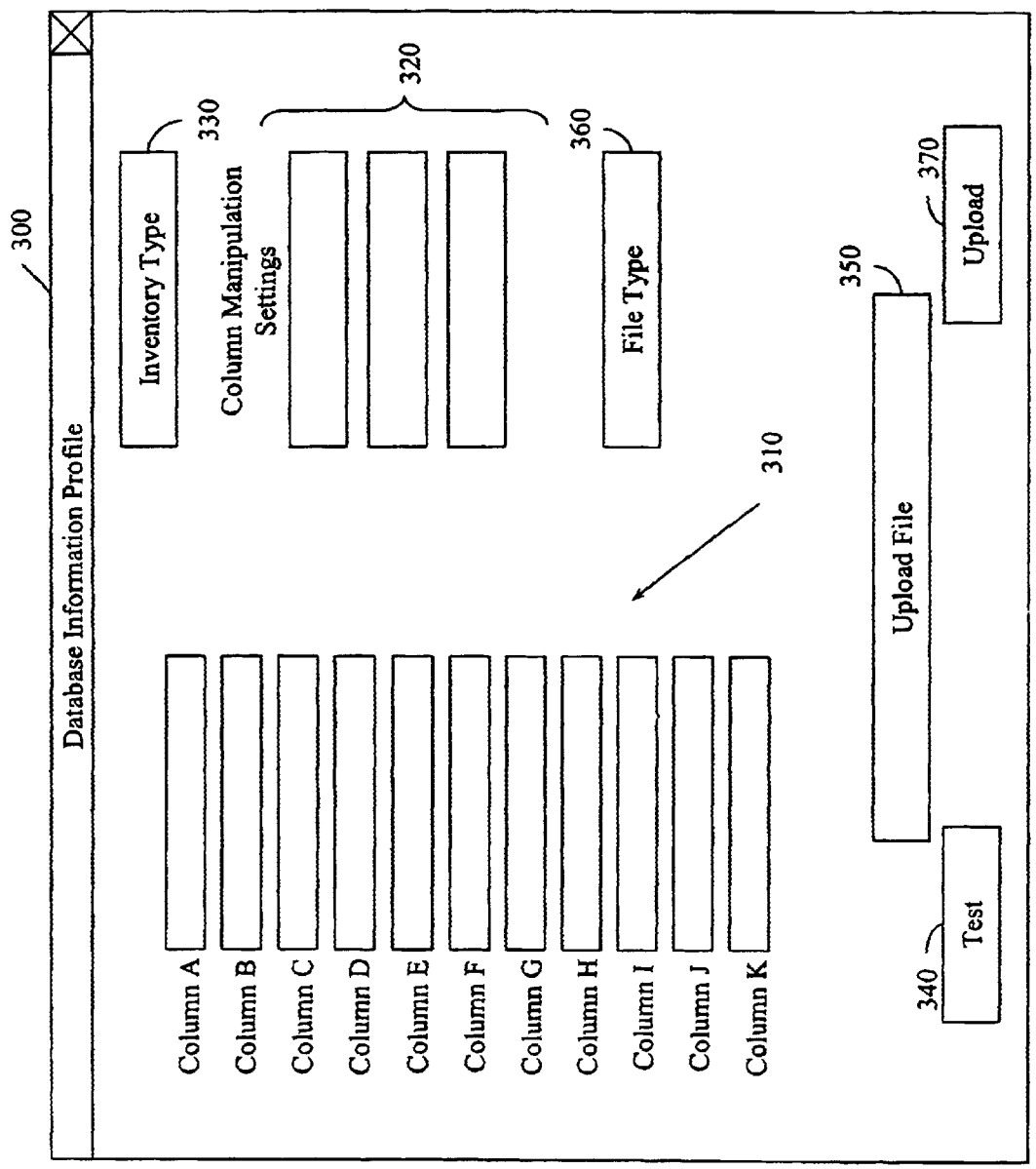
FIG. 3 is an exemplary database information profile screen in accordance with aspects of the present invention.

With reference to FIGS. 2A and 2B and continuing reference to FIG. 1, after accessing the server 20 using a web browser, the client 10 performs a conventional log-in using a client-defined username and password. In order to upload an inventory database 12 onto the server machine 22, the client 10 configures 100 a database information profile (FIG. 3). The database information profile 300 provides the upload processing program 26 with the information about the inventory database 12 that is necessary for a successful upload of the inventory database 12. The database information profile 300 defines the database file format and database column ordering used during the upload process.

With reference to FIG. 3 and continuing reference to FIGS. 2A and 2B, in one embodiment, the database column ordering present in the inventory database 12 is configured using previously defined drop down menus 310 found within the database information profile 300. The drop down menus 310 define what types of inventory database columns are accepted by the upload program for processing and insertion into the centralized database. For example, the database information profile illustrated in FIG. 3 may be customized for uploading inventory databases of musical selections. In this case, a client may define column A as "Artist," column B as "Title," and column D as "price," depending on the particular inventory database being uploaded. The client may select the type of inventory being uploaded 330, such as musical selections. It is to be appreciated that the present invention is applicable to uploading a variety of inventory databases, such as antiques, sporting goods, and the like, as well as other databases. If the client's inventory database contains a column type that is not defined in the drop down menus 310, the client selects "Do Not Use" because that type of column is not supported for processing by the upload program.

In an alternate embodiment, the database information profile is stored as column headers in the first line of the inventory database in order to define what type of data each column contains and the ordering of the columns in the inventory database. Acceptable column header types are predetermined so that the server-side processing program understands the category of each column of the inventory database. During processing of the inventory database, acceptable columns are processed, while unacceptable columns are ignored. In another embodiment, a separate data file may be created, which contains column definitions and column ordering for use with the upload processing program.

Database information profiles are linked with individual clients by the client's self-defined username and password. After an initial configuration of the database information profile 300, a client may simply access its upload profile and continue with a routine database upload session.

In addition to the database file format and the database column ordering used during the upload process, the database information profile contains optional database column manipulation settings 320. The database column manipulation settings add data to the centralized database, by way of default settings, and transform data in the inventory database while the data is being processed on the server. For example, a data manipulation setting may add a default setting for given columns such that if the given columns do not exist in the inventory database, they will be included in the centralized database. Another data manipulation setting manipulates numeric data, such as prices, which are located in a given column for conversion of currency or adding or subtracting a given amount or percentage from a numeric column in the client's inventory database. In another embodiment, data manipulation settings standardize column values within the centralized database. In this embodiment, the client defines or matches up values used in the inventory database to a standard set of values used in the centralized database.

Referring back to FIGS. 2A and 2B, once the database information profile or upload profile is configured 100, it is transmitted 110, along with the inventory database, to and received 200, 210 by the server. In one embodiment, the database information profile is transmitted once and stored in memory for use during future uploads. In another embodiment, the profile is transmitted along with each database upload. As is described more fully below, the client may perform a test upload 150 of the inventory database 12 by selecting the test upload option 340. The test upload 340 emulates an actual database upload except that the data contained within the inventory database 12 is not inserted into the server's centralized database 24.

As the transmitted database and database information profile are received by the server, the database upload program determines 220 the format and column ordering of the database being uploaded. In one embodiment, the upload program determines the database format and column ordering based on information configured into the information database profile 300. In another embodiment, the upload program determines the database file format and/or column ordering based on the data within the database itself. More particularly, the database upload program recognizes known characteristics of pre-programmed file types and column orderings in order to make the appropriate determinations "on the fly."

Once the format and column ordering are determined 220 for the uploaded database, the upload program reads and parses 120, 230 the client's inventory database. More particularly, the inventory database is read and parsed into rows and columns as it is transmitted to the server. Because the database file format of the uploaded database is defined in the database information profile or determined from the database itself, the upload program utilizes specialized programming code to decipher each database type line-by-line. The programming code in the upload program parses various ASCII file types, such as tab, comma, hype, and semi colon to limited text files. It is to be appreciated that more complex database formats, such as Microsoft Access, Microsoft Excel and other like formats may be uploaded and parsed row-by-row and column-by-column by the upload program 26.

As the data within the inventory database is parsed 120, 230, row-by-row and column-by-column, the upload processing program manipulates and maps the data 130, 250 into proper column locations within the centralized database 24 according to the configured database information profile 300. For example, if the inventory database contains price data in column A and the centralized database contains price data in column C, the price data from the inventory database will be mapped and stored in column C of the centralized database. The inventory database is uploaded into the centralized database in a real-time manner for immediate access by potential buyers who may access the server using a web browser or other like program.

Figure 4:
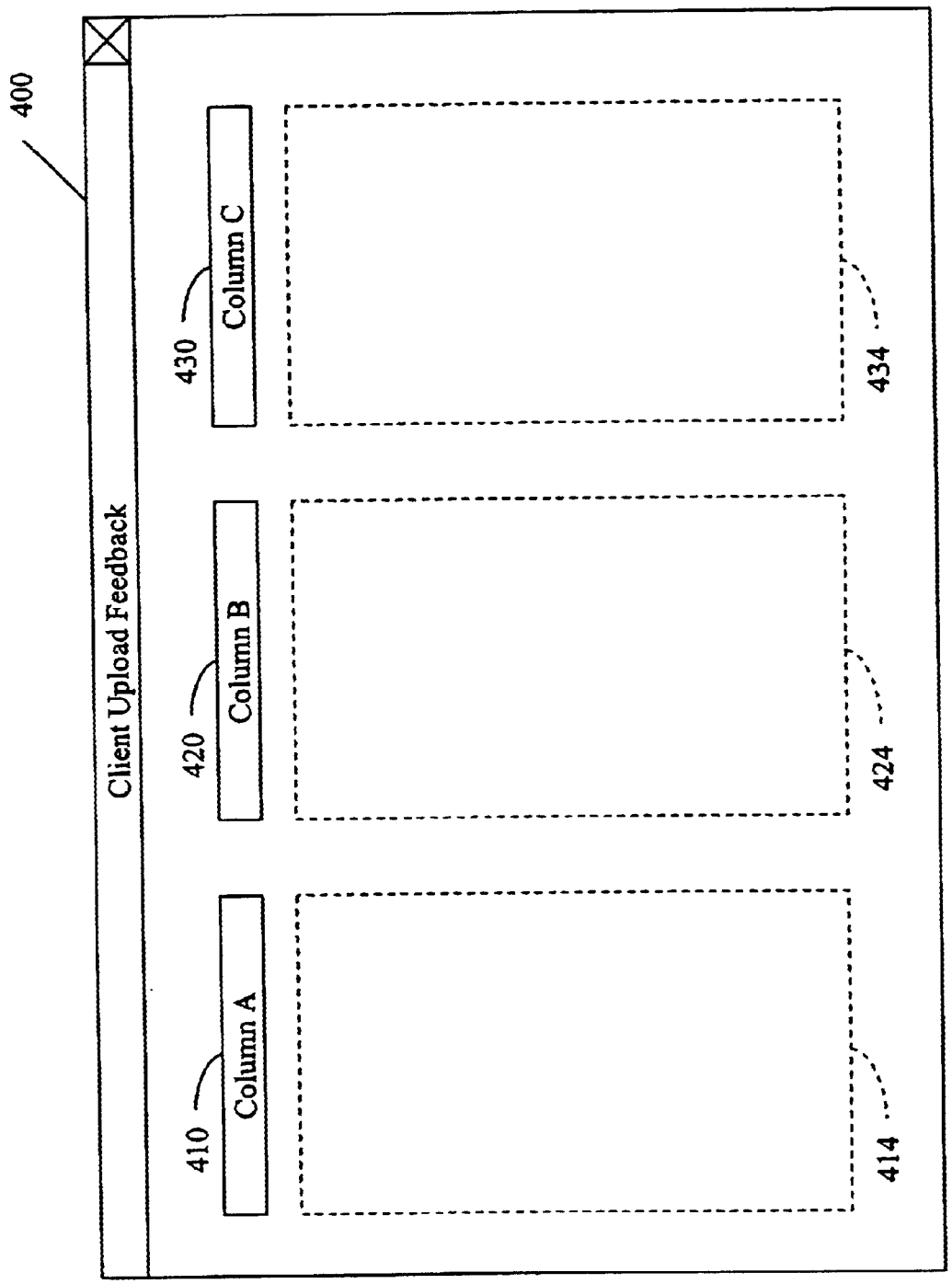
FIG. 4 is an exemplary test upload feedback screen in accordance with the present invention.

In addition, the upload processing program 26 recognizes the type of syntax 130, 240 accepted in each column. If a column contains data of incorrect syntax, an error message may be generated 140, 260 and displayed. For example, if a client is uploading text characters into a column which was defined previously as a numeric column, an error message may be generated. More particularly, as the uploaded data is mapped and checked for correct syntax, an upload feedback screen 400 is generated 140, 260, such as is shown in FIG. 4, in order to notify the client of any errors in the upload. The upload feedback screen 400 lists each of the column headings 410, 420, 430 of the centralized database 24 and also lists the actual data 414, 424, 434 from the client's inventory database that will be entered into the columns of the centralized database 24.

As discussed above, the client may perform a test upload 150 of the inventory database 12 by selecting the test upload option 340. The test upload 340 emulates an actual database upload, except that the data contained within the inventory database 12 is not inserted into the server's centralized database 24. In the case of a test upload, the uploaded database is parsed into rows and columns 120, 230, mapped and syntax checked 130, 240, 250, until the last line of the database file is reached 170. The data subject to the test upload 150 is then displayed on a feedback screen 140, 260, such as that illustrated in FIG. 4, for review by the client. The test upload function is advantageous because it allows the client to confirm that the upload profile is configured correctly.

In the case of a real upload, the parsed, mapped, and syntax checked data is inserted 160 into the centralized database until the last line of the database filed is reached 170. Again, in the case of a real upload, a feedback screen is generated and displayed 140, 260. In the case of either a test upload or a real upload, a client may determine whether errors are present 180 in the uploaded data. In the case of errors in the upload, the client may reconfigure the database information profile and/or edit faulty data within the database file itself. In the case of a conforming upload having no errors 180, the upload process is completed 190 and a summary feedback screen is displayed to the client. The summary feedback screen includes the number of items processed, the number of lines actually uploaded onto the centralized database, the number of line errors, and the upload processing time statistics. In addition, the system administrator, who controls the centralized database, receives summary information by e-mail on clients' uploads, including a random sampling of uploaded data and a report of errors during uploading.

It is to be appreciated that the client has the choice of replacing a previously uploaded inventory database or appending the current inventory database to the existing inventory database. In addition, it is possible to delete inventory from an existing centralized database in the same manner in which inventory is added to the centralized database. The process for transferring and parsing the inventory database are as described above, except that information is removed from the centralized database instead of being added.

One embodiment of the upload processing program in the PERL programming language, which is specially adapted for uploading and processing music inventory databases, is as follows:

```perl
sub login {
    require "$htdocs/lib/crypt.pl";
    &getcookies ( );
    $sid="";
    if ($in{'user'} and $in{'pw'}) {# use hand typed login info first
                                    $user=$in{'user'};
                                    $pw=$in{'pw'};
                    } else { # or use cookie
                                    $ll=&decrypt
                                    ($cookie{'ll'},$key);
                                    ($user,$pw)=split (/\|/,$ll);
                    }
    $user=~ tr/a-z/A-Z/;
    $pw =~ tr/a-z/A-Z/;
    $password="";
if ($user and $pw) {
        $q="select email,name,password,seller,last_login from
        $seller_table where
(upper(email)='$user' or upper(name)='$user' or
upper(real_name)='$user') and
upper(password)='$pw'";
        &sql ($q);
        &fetch ( );
# print "$cont $user - $pw -- $password ---- $q";exit;
        if ($password) {# yes, vaild password
            $user_pw="$user|$pw";
            $user_pw=&encrypt ($user_pw,$key);
            # set cookies
            if ($in{'user'} and $in{'pw'}) {# store only if hand entered
            print "Set-Cookie: ll=$user_pw; path=/; expires=$expires;
            domain=$domain\n";
            }
            $cookie{'ll'}=$user_pw;
#print "$cont $seller";exit;
            return ($seller);
        } else {
        print "Location:
        $http/seller/login.cgi?invalid=1&url=$in{'url'}\n\n";
        exit;
        }
} else {
        print "Location: $http/seller/login.cgi?url=$in{'url'}\n\n";exit;
}
}
1;
@media    =("CD", "CD5","CD3","CDR","CDV",
"2CD","Digi Pak","Box Set","DVD","Calendar",
"Cassette","DAT","LD","LP","2LP",
"3LP","4LP","LP Gatefold","EP","78","7\"","7\"PS",
"Split  7\"","2X   7\"","10\"","12\"",
"VideoNTSC", "VideoPAL","NTSC+PAL","Flat","Flexi","Book",
"Memorabilia","PicDisc","Photograph","Poster",
"Postcard","Patch","Pin","Sheet Music",
"Sticker","T-Shirt","Zine","Any/All","Other");
$media=@media;
$format=@format;
%media=(
'Other'         ,'1',
'CD'            ,'2',
'2CD'           ,'32',
'CD5'           ,'12',
'CD3'           ,'13',
'CDR'           ,'10',
'CDV'           ,'9',
'LD'            ,'3',
'LP'            ,'4',
'2LP'           ,'33',
'3LP'           ,'39',
'4LP'           ,'40',
'EP'            ,'31',
'7"'            ,'14',
'10'"           ,'15',
'12'"           ,'16',
'Cassette'      ,'5',
'DAT'           ,'6',
'VideoNTSC'     ,'7',
```

-continued

```perl
'VideoPAL'      ,'17',
'NTSC+PAL'      ,'30',
'Any/All',      ,'8',
'DVD'           ,'11',
'T-Shirt'       ,'18',
'Poster'        ,'19',
'Book',         ,'20',
'Memorabilia'   ,'21',
'Postcard'      ,'22',
'Calendar'      ,'23',
'Sticker'       ,'24',
'Patch'         ,'25',
'Flat'          ,'26',
'Other'         ,'27',
'Pin'           ,'28',
'Flexi'         ,'29',
'Zine'          ,'34',
'Pic Disc'      ,'35',
'Split 7"'      ,'36',
'2X 7"'         ,'37',
'Photograph'    ,'38',
'7" PS'         ,'41',
'78'            ,'42',
'Box Set'       ,'43',
'Sheet Music'   ,'44',
'Digi Pak'      ,'45',
'LP Gatefold'   ,'46',
);
while (($a,$b) = each(%media)) {
    $media{$b}=$a;
}
1;
#!/usr/bin/perl
require ("../lib/server_specific.pl");
require ("$htdocs/lib/global.pl");
require ("$htdocs/lib/mysql.pl");
require ("$htdocs/lib/media.pl");
require ("$htdocs/lib/upload_columns.pl");
require "$htdocs/lib/cgi-lib.pl";
require "$htdocs/lib/login.pl";
&ReadParse ( );
$id=&login ( );
$q="select name from seller where seller=$id";
&sql ($q);
&fetch ( );
$ q = "select
delimiter,qualifier,computer_type,media_types,upload.seller,col,upfile,
d_media,d_condition,mult_amount,add_amount,percent_amount,
pickup_url,pickup_day,tested,approved,last_up
load from upload,seller where upload.seller='$id' and
seller.seller = upload.seller";
&sql ($q);
&fetch ( );
load up pre-set columns so it will work with the defaults in drop down
(@list)=split (/,/,$col);
foreach $a (@list) {
    ($col_num,$value)=split (/=/,$a);
    $col($col_num}=$value;
}
$col="";
for ($x=1;$x<18;$x++) {
    $col.="\n\n<tr><td>Column ".chr(64+$x)." </td><td>\n";
    $col.="<select name=\"c$x\">\n";
    $col.="<OPTION value=\"-1\"> --- Do Not Use ---".chr(10);
    foreach $a (@columns) {
        if ($columns{$a}==$col{$x}) {$sel="selected";} else {$sel="";}
        $col.="<OPTION value=\"$columns{$a}\" $sel>$a\n";
    }
    $col.="</select>\n</td></tr>";
}
# $col.="</table>";
$d_med="<option value=\"\">".chr(10);
$m=@media;
for ($x=0;$x<$m;$x++) {
    if ($media{$media[$x]}==$d_media) {$chk="selected";}
    else {$chk="";}
        $d_med.=
            "<OPTION VALUE=\"$media{$media[$x]}\"
$chk>$media[$x]  ".chr(10);
```

```
}
$d_media=$d_med;
if (!$url) {$url="http://";}
#if ($upfile) {$upfile1="<font size=-1>Due to browser security
restrictions, a default Upload File can't be set</font><br>";}
$submit="
<input type=radio name=\"delete\" value=\"del\" checked>Delete
Current Inventory Before Upload  
<input type=radio name=\"delete\" value=\"add\">Add
to Current Inventory";
$temp="day$pickup_day";
${$temp}="selected";
show proper submit button ###
        $submit.="
<input type=submit name=submit value=\"Test Upload\">

<input type=submit name=submit value=\"Upload\">
";
(@list)=split (/\|\,$media_types);
foreach $a (@list) {
        ($med_num,$value)=split (/\^/,$a);
        $med{$med_num}=$value;
}
$y=0;
$z=1;
$m="";
$cl=1;
foreach $x (@media) {
$v="";
$v=$med{$media{$x}};
if (!$v and $x=~ /cass/i)     {$v.="Cass,MC,Tape,Cas,CS";}
if (!$v and $x=~ /cd5/i)      {$v.="C5,CD 5,CDS,CD Single,CDSING";}
if (!$v and $x=~ /shirt/i)    {$v.="Shirt,T,Tshirt,Tee";}
if (!$v and $x=~ /videontsc/i) {$v.="NTSC,Video,Vid";}
if (!$v and $x=~ /videopal/i) ($v.="PAL";}
if (!$v and $x=~ /^12/i)      {$v.="12, 12in";}
if (!$v and $x=~ /^10/i)      {$v.="10, 10in";}
if (!$v and $x=~ /^7\"\Z/i)   {$v.="7,45,7in";}
if (!$v and $x=~ /^7\" ps\Z/i)  ($v.="7ps,7 ps,ps";}
if (!$v and $x=~ /zine/i)     {$v.="mag";}
if (!$v and $x=~ /2lp/i)      {$v.="DLP,LPx2,2xLP";}
if (!$v and $x=~ /3lp/i)      {$v.="LPx3,3xLP";}
if (!$v and $x=~ /4lp/i)      {$v.="LPx4,4xLP";}
if (!$v and $x=~ /EP/i)       {$v.="E.P.,Mini LP";}
if (!$v and $x=~ /pin/i)      {$v.="Button";}
if (!$v and $x=~ /box/i)      {$v.="BS";}
if (!$v and $x=~ /digi/i)     {$v.="DIGI";}
if (!$v and $x=~ /photo/i)    {$v.="Photo";}
if (!$v and $x=~ /sheet/i)    {$v.="SM";}
        $v=~ s/"/\"/g;
        if ($x=~ /any.all/i) {next;}
        $m.="<tr>" if ($y==0);
            $m.="<td valign=top align=right>$x</td><td
            valign=top><input    type=text
name=m$media{$x} size=27 maxlength=60 value=\"$v\"></td>";
        $m.="</tr>" if ($y==$cl);
        if ($y==$cl) {$m.="\n";$y=-1;}
        $y++;
        $z++;
}
for ($x=$y;$x<=$cl;$x++) {
        $m.="<td> </td><td> </td>";
}
$m.="</tr>"
if (!$pickup_url) {$pickup_url="http://";}
if ($computer_type eq 'mac') {$mac="checked";$pc="";}
else {$pc="checked";$mac="";}
# show proper drop down for File Type
$delim1="";$delim2="";$delim3="";$delim4="";$delim5="";
if ($delimiter eq 'tab') {$delim1="selected";}
if ($delimiter eq 'com') {$delim2="selected";}
if ($delimiter eq 'sem') {$delim3="selected";}
if ($delimiter eq 'pip') {$delim4="selected";}
if ($delimiter eq 'das') {$delim5="selected";}
# show proper drop down for qualifier
$qual1="";$qual2="";$qual3="";
if ($qualifier eq 'dquote') {$qual1="selected";}
if ($qualifier eq 'squote') {$qual2="selected";}
if ($qualifier eq 'none') {$qual3="selected";}

&top ("$name upload");
&template ("$htdocs/seller/upload.htx");
&bot ( );
exit;
#!/usr/bin/perl
require ("../lib/server_specific.pl");
require ("$htdocs/lib/global.pl");
require ("$htdocs/lib/mysql.pl");
require ("$htdocs/lib/media.pl");
require ("$htdocs/lib/upload_columns.pl");
require "$htdocs/lib/cgi-lib.pl";
require "$htdocs/lib/index.pl";
require "$htdocs/lib/login.pl";
require Text::CSV_XS;
$|=1;
$time1= time ( );
$location="/tmp";
$zz=0;
$limit=500;
get seller id from seller table
$id=&login( );
$seller=0;
$q="select seller,password,name,real_name,email from seller where
seller=$id";
&sql ($q);
&fetch ( );
if (!$seller) {&bad("Seller does not exist."); exit;}
$name=substr ($name,0, 18);
$name=&sql_encode1($name);
Upload the file #######
$cgi_lib::writefiles = "$location";
    $cgi_lib::maxdata = 25000000;
    my (%in, # The form data
    %cgi_cfn,    # The uploaded file(s) client-provided name(s)
    %cgi_ct,     # The uploaded file(s) content-type(s). These are
                 # set by the user's browser and may be unreliable
    %cgi_sfn,    # The uploaded file(s) name(s) on the
                 server (this machine)
    $ret,    # Return value of the ReadParse call.
    $buf     # Buffer for data read from disk.
    );
$ret = &ReadParse(\%in,\%cgi_cfn,\%cgi_ct,\%cgi_sfn);
if (!defined $ret) {
    &bad ("Error in upload, try again or contact MusicStack");
} elsif (!$ret) {
    &bad ("Error in upload, try again or contact MusicStack");
}
    $cgi_lib::writefiles = $cgi_lib::writefiles;
    $cgi_lib::maxdata    = $cgi_lib::maxdata;
$time2= time ( );
$name1=$name;
$name1=~ tr/A-Z/a-z/;
$name1=~ tr/a-z0-9/\-/cs;
$name1=~ s/\-+/\-/g;
$name1.=".txt";
rename ("$in{'upfile'}","$location/$name1");
$upfile=&sql_encode1 ($cgi_cfn{'upfile'});
$d_condition=&sql_encode1 ($in{'d_condition'});
$d_media=&sql_endcode1 ($in{'d_media'});
$computer=&sql_endcode1 ($in{'computer'});
$mult_amount=&sql_endcode1 ($in{'mult_amount'});
$add_amount=&sql_endcode1 ($in{'add_amount'});
$percent_amount=&sql_endcode1 ($in{'percent_amount'});
$pickup_url=&sql_encode1 ($in{'pickup_url'});
$pickup_day=&sql_encode1 ($in{'pickup_day'});
$delim=&sql_endcode1($in{'delim'});
$qual =&sql_endcode1($in{'qual'});
remember all drop down values ($col) and set: value of
drop down=column
$col="";
for ($x=1;$x<50;$x++) {
    $temp="c$x";
    if (!$in{$temp}) {next;} # skip ignore columns
    $col.="$x=$in{$temp},";
    if ($in{$temp}<0) {next;}
        if ($c{"c$in{$temp}"})    {&bad ("Duplicate drop
        down value: <font
color=red>$columns_{$in{$temp}}</font><br>Please use
this value only one time.");}
```

-continued

```
    $c{"c$in{$temp}"}=$x-1; # value of drop down = column number
print "$cont $c$in{$temp} --".($x-1)."<br>";
}
$mm="";
foreach $x (@media) {
    $temp="m$media{$x}";
    if (!$in{$temp}) {next;} # skip ignore columns
    $in{$temp}=~ s/\//g;
    $in{$temp}=~ s/\|//g;
    $mm.="$media{$x}^$in{$temp}|";
    if ($in{$temp}<0) {next;}
}
$mm=&to_sql ($mm);
#print "$cont $mm";exit;
if (!$in{'d_condition'})   {&bad ("Please enter a default condition.");}
if (!$c{'c3'} and !$in{'d_media'})   {&bad
            ("Please enter a default media type.");}
# if format/media not selected and no default media
if (!defined($c{'c1'})) {&bad ("You must define an artist column.");}
if (!defined($c{'c2'})) {&bad ("You must define a title column.");}
if (!defined($c{'c4'})) {&bad ("You must define a price column.");}
if (length ($upfile)<3 and !($in{'submit'}=~ /export/i)) {&bad
            ("Please enter an upload file.");}
if ($in{'pickup_url'}=~ /http:W./) {
    if (!($in('pickup_url'}=~ /\./)) {&bad ("Please enter a vaild
            URL for database pickup.");}
}
Add the profile to table UPLOAD ######
if (!$test) {$test="0";}
if (!$approved) {$approved="0";)
$temp_seller=$seller;
$seller="";
$q="select seller from upload where seller='$temp_seller'";
&sql ($q);
&fetch ( );
if (!$seller) {
    $seller=$temp_seller;
        $q = "insert into upload
(seller,col,upfile,d_media,d_condition,mult_amount,add_amount,
percent_amount,pickup_url,pickup_day,tested,approved,last_upload,
media_types,computer_type,delimiter,qualifier)
values
($seller,'$col','$upfile','$d_media','$d_condition',
'$mult_amount','$add_amount','$percent_amount',
'$pickup_url','$pickup_day','$tested','$approved',
$date8_,'$mm','$computer','$delim','$qual')";
} else {
    $seller=$temp_seller;
        $q = "update upload set
col='$col',upfile='$upfile',d_media='$d_media',
d_condition='$d_condition',mult_amount='$mult_amount',
add_amount='$add_amount',
percent_amount='$percent_amount',pickup_url='$pickup_url',
pickup_day='$pickup_day',tested='$tested',approved='$approved',
last_upload=$date8_,media_types='$mm',
computer_type='$computer',delimiter='$delim',qualifier='$qual'
where seller=$seller";
}
&sql ($q);
#print "$cont $q";exit;
$seller=$temp_seller,
$in{'mult_amount'}=~  s/[^0-9\.]//g; # only allow
numbers and decimals
$in{'percent_amount'}=~ s/[^0-9\.]//g;
$in{'add_amount'}=~  s/[^0-9\.]//g;
if (!$in{'mult_amount'}) ($in{'mult_amount'}=1;} # set
so equals itself
if (!$in('mult_amount'}<0) {&bad ("Please enter a valid multiplying
number.");}
if ($in('percent_amount'} and $in{'percent_amount'}<1) {&bad
("Please enter a valid percent (1% or higher): $in{'percent_amount'}% is
not valid.");}
######### Parse the file ##################
print "$cont<html>
<head>
<title>Seller Upload</title>
<BODY bgcolor=#FFFFDD text=#000000 link=#0000CA
vlink=#00458A alink=#000000 bgcolor=#FFFFFF>
</head>
<pre>
";
$stop=2;
Delete old inventory ####
if ($in{'delete'} eq "del" and !($in{'submit'}=~ /test/i)) {
    $del_time1= time ( );
        print "<b>Current inventory deleted</b>\n\n";
        $q="update items set show_item=-1 where seller=$seller
        and type='s'";
        &sql ($q);
        $del_time2= time ( );
        sleep (7);
}
$mail="Store : $name ($seller)
Real : $real_name
Email : $email
$http/seller/upload.cgi?user=$email&pw=$password\n\n";
set up delimiters ###
if ($delim eq "tab") {$d="\t";}
if ($delim eq "com") {$d=",";}
if ($delim eq "sem") {$d=";";}
if ($delim eq "pip") {$d="|";}
if ($delim eq "das") {$d="-";}
if ($qual eq "dquote") {$q="\"";}
if ($qual eq "squote") {$q="'";}
if ($qual eq "none") {$q="";}
$csv = Text::CSV_XS->new({
            'quote_char' => $q,
            'escape_char' => $q,
            'sep_char' => $d,
            'binary' => 0
            });
$sub[1] =18; #band
$sub[2] =20; #title
$sub[3] =6; #media
$sub[4] =5; #price
$sub[5] =4; #quantity
$sub[6] =8; #label
$sub[7] =10; #release id
$sub[8] =10; #country
$sub[9] =12; #release date
$sub[10] =9; #condition
$sub[11] =10; #genre
$sub[12] =15; #url1
$sub[13] =15; #url2
$sub[14] =30; #descr
$sub[15] =8; #ref
$space=".................................................";
$space="                                                  ";
#create associate array of what users media definitions =
musicstack media defs
foreach $temp (@media) {
    $t="m$media{$temp}";
    if (!defined($in{$t})) {$in{$t}=$temp;}
    $in{$t}=~ s/ +,/,/g;
    $in{$t}=~ s/, +/,/g;
    (@|)=split (/,/,$in{$t});
    foreach $a (@|) {
        $a=~ tr/a-z/A-Z/;
        $m{$a}=$temp;
    }
    $temp1=$temp;
    $temp1=~ tr/a-z/A-Z/;
    $m{$temp1}=$temp;
}
set end of line character for Mac/PC ##
if ($computer eq 'mac') {
    $/="\r"; # set EOL char for Mac
} else {
    $/="\n"; # set EOL char for PC
}
open (F,"$location/$name1");
$x=0
$ok=0;
$count=0;
$skip_count=0;
$done_lines=0;
while (<F>) {
    $_=~ s/ +$d/$d/g;
```

-continued

```
$_ =~ s/$d +/$d/g;
@list="";
$_ =~ s/\r//g;
$_ =~ s/\n//g;
$temp=chr(163); # get rid of pound sign
$_ =~ s/$temp//g;
if ($delim eq "tab" and $qual eq "none") {
    (@list)=split (/$d/,$_);
} else {
    if ($csv->parse($_)) {
        @list = $csv->fields;
    } else {
        $err = $csv->error_input;
        $skip=1;
        print "<font color=red>Invalid text qualifier. Try a different
        qualifier setting on the previous page. </font> $err<br>";
        $count++;
        $skip_count++;
        next;
    }
}
#print "$cont $list[0] -- $list[1] -- $list[2] -- $list[3]<br>";
$x=0;
$count++;
$skip="";$skip1="";
foreach $a (@list) {# get rid of surrounding quotes
    $a =~ s/\n//g;
    $a =~ s/\r//g;
    if ($a =~ /^"/ and $a =~ /"\Z/) {
        $a =~ s/^"//;
        $a =~ s/"\Z//;
    }
    $a =~ s/""/"/g;
    $a =~ s/^ +//g;
    $list[$x]=$a;
    $x++;
}
the $XXXX =$list[$c{'cX'}] below must match the
%columns (/lib/upload_columns.pl) exactly

$band      ="";
$title     ="";
$media     ="";
$price     ="";
$quantity  ="";
$label     ="";
$release_id ="";
$country   ="";
$release_date="";
$condition ="";
$genre     ="";
$url1      ="";
$url2      ="";
$descr     ="";
$ref       ="";
$band      =$list[$c{'c1'}] if (defined($c{'c1'}));
$title     =$list[$c{'c2'}] if (defined($c{'c2'}));
$media     =$list[$c{'c3'}] if (defined($c{'c3'}));
$price     =$list[$c{'c4'}] if (defined($c{'c4'}));
$quantity  =$list[$c{'c5'}] if (defined($c{'c5'}));
$label     =$list[$c{'c6'}] if (defined($c{'c6'}));
$release_id =$list[$c{'c7'}] if (defined($c{'c7'}));
$country   =$list[$c{'c8'}] if (defined($c{'c8'}));
$release_date=$list[$c{'c9'}] if (defined($c{'c9'}));
$condition =$list[$c{'c10'}] if (defined($c{'c10'}));
$genre     =$list[$c{'c11'}] if (defined($c{'c11'}));
$url1      =$list[$c{'c12'}] if (defined($c{'c12'}));
$url2      =$list[$c{'c13'}] if (defined($c{'c13'}));
$descr     =$list[$c{'c14'}] if (defined($c{'c14'}));
$ref       =$list[$c{'c15'}] if (defined($c{'c15'}));
Do Math Operations On Price ####
if ($list[$c{'c4'}]=~ /,..\Z/) {# convert 9,22->9.22 for Total Recall
    $list[$c{'c4'}]=~ s/,(..)\Z/.$1/;
}
# add in PROMO issue for vinyl vendors
if ($list[$c{'c14'}]!~ /stock/i and $seller==1805) {
    $list[$c{'c14'}]="Promo Issue/$list[$c{'c14'}]";
}
$list[$c{'c4'}]=~ s/[^0-9\.]//g; # get rid of
extrainious stuff ($, &, etc.)
if ($list[$c{'c4'}]>0) {
    $list[$c{'c4'}]=$list[$c{'c4'}]*$in{'mult_amount'};
    if ($in('mult_amount')>0);
    $list[$c{'c4'}]=
    $list[$c{'c4'}]+($list[$c{'c4'}]*$in{'percent_amount'}/100);
    $list[$c{'c4'}]=$list[$c{'c4'}]+$in{'add_amount'};
}
Real Insert ###
$temp=$count;
if ($count==1 or !($temp%==20) and !$test) {
    $u=0;
    if ($count==1) {
        if (!($in('submit')=~ /test/i)) {
            print "<font color=navy>Uploading new inventory . . .
            <br><br></font>";
        }
    }
}
Print Header #########
print "\n";
foreach $aa (@columns) {
    $u++;
    $temp="col$u";
    $temp1="c$u";
    if ($c{$temp1} eq "") {next;}
    $aa=substr ("$aa$space",0,$sub[$u])." ";
    $aa =~ s/Artist V B /Artist   /;
    if ($list[$in{$temp}]) {print "<b>$aa</b>";}
}
print "\n";
}
########################################
Do for every item in each row ####
########################################
$u=0;
$skip="";
foreach $aa (@columns) {
# catinate first name and last from separate column to create one column
# for recordsbymail.com
if ($seller==1535 and $list[2]) {
    $list[3]="$list[2] $list[3]";$list[2]=""; # becomes: Howard Jones
}
    $u++;
    $temp="c$u";
    $item=$list[$c{$temp}];
    $item =~ s/\n//;
    $item =~ s/\r//;
    $item =~ s/\r//;
if(!$item and $u==1) {$item='Artist Not Listed';$skip=1;}
if (!defined($c{$temp})) {next;} # skip column not defined in drop down
if ($u==10) {# set default condition if none assigned
    if (!$item) {$item=$in{'d_condition'};}
}
if ($u==3) {# do default media if none assigned
    if (!defined($media_col)) {# if media ever exists
        don't allow media type fill in
        if ($item) {$media_col=1;} # yes, they have a media column
        if (!defined($item)) {$item=$in{'d_media'};} # set media to default
}
    $item_old=$item;
    $item =~ tr/a-z/A-Z/;
    $item=$m{$item};
    $item1=$item;
    if (!$item) {$item="???";$item1="???";$skip=1;}
    else ($media=$item;)
}
    if ($c{$temp} eq "") {next;}
    if ($u==1 and !$item)   {next;} #$item="????";
    $skip=1;} # band
    if ($u==2 and !$item)   {$item=$band;} #"????";
    $skip=1;} # title
    if ($u==10 and !$item)  {$item=$in('d_condition');}
    # condition
    if ($u==5 and !$item)   {$quanity=1;$item=1;}
    # set default quanitity
    if ($u==5) {$item=~s/[^0-9]//g;$quanity=$item;
    if ($item>99) {$item=99;}}
    if ($u==4) {$item=~s/[^0-9\.]//g;
    $price=$item;} # clean up price
```

```perl
    if ($u==4 and $item<=.01) {$item="????";$skip=1;} # price
    if ($u==1) {#clean up band(no all caps, no 2x spaces, or
weird 1st chars)
        $item=~ s/ +/ /g;
        $item=~ s/^[^a-zA-Z0-9]+//g;
        if ($item!~ / the the\Z/) { # don't do it for the band THE THE
        $item=~ s/^the //gi;
        }
        $item=~ s/ +/ /g;
        $item=~ s/^ +//g;
        $item=~ s/ \Z//g;
        $item=~ s/ ,/,/g;
        $item=~ s/,/, /g;
        $item=~ s/ a //g;
        $item=~ s/,the\Z//i;
        $item=~ s/,a\Z//i;
        $item=&cap ($item);
        $band=$item;
    }
    if ($u==2) { #clean up title (no all caps, no 2x spaces,
or weird 1st chars)
        $item=~ s/ +/ /g;
        $item=~ s/^[^a-zA-Z0-9]+//g;
        $item=&cap ($item);
        $title=$item;
    }
    $item=~ s/\<.*\>//g; # don't allow HTML in display output
    $item=~ s/\<\/\</g; # don't allow < to mess up output
    $item=~ s/\>/\>/g; # don't allow > to mess up output
    $item=substr ("$item$space",0,$sub[$u])." ";
    if ($u==3) {if (!$item1) {$item=substr
("$item_old$space",0,$sub[$u])." ";skip=1;}}
if ($skip and !$skip1) {$item = "<font
color=red><b>$item</b></font>";$skip1=1;$skip_count++;}
if ($in{'submit'}=~ /test/i and $skip_count>9) {next;}
print "$item";
if ($in{'submit'}=~ /test/i and $count>6 and !$skip) {$test=1;next;}
if ($count==$stop) {
$aa=substr ("$aa         ",0,10);$mail.="$aa : $item\n";$stop_flag=1;}
$temp="";
}
print "\n";# if ($skip_count< 10);
$media=~ tr/a-z/A-Z/;
$media=$media{$m{$media}};
if (!defined($media)) {$media=$in{'d_media'};}
# use default MEDIA if no MEDIA given
if (!defined($media)) {$skip=1;}
if ($skip) {next;}
if (!($in{'submit'}=~ /test/i)) {
#$q="SELECT MAX(item) from $items_table";
#&sql ($q);
#&fetch ();
#$num=$row[0]+1;
$num="NULL"; # so that auto_increment will work
if (!$quanity) {$quanity=1;}
Make varible SQL friendly ###
$price=~ s/\$//g;
$price=~ s/[^0-9\.]//g;
$quanity=~ s/[^0-9]//g;
foreach
(/,/,"band,title,label,ref,release_id,release_date,ge
e,media,quanity")) {${$_}=&to_sql (${$_});}
$descr=~ s/\<br\>/\r/gi;
if ($zz==0) {
$q = "INSERT INTO $items_table (";
$q.= "item,seller,band,title,media,price,quanity,label";
$q.= ",genre2,date,country,condition,url,url1,descr,";
$q.= "show_item,item_date,first_date,type,tracking,";
$q.= ") VALUES";
}
if ($zz>0) {
$q.=",";
}
$q.= "($num,$seller,'$band','$title',$media,$price,$q
$q.= "'$label','$release_id','$genre','$release_date',"
$q.= "'$country','$condition','$url1','$url2','$descr',2,"
$q.= "'$cdate','$cdate','s','$ref','$name')";
$zz++;

    if ($zz >=$limit) {
        $zz=0;
    # print "$q<br>";
        &sql ($q);
    }
    if ($stop_flag) {$mail.="\n";$stop_flag="";$stop=$stop
    }
}
if ($test) {
    print "<br><b>.<br>.<br></b>";
} else {
    if ($zz>0) {
        &sql ($q); # flush out insert buffer
    }
$time3= time ( );
    $add=$count-$skip_count;
$file_upload_time=$time2-$time1;
$item_upload_time=$time3-$time2;
$del_time=$del_time2-$del_time1;
if ($del_time>=60) {
    $del_time=sprintf ("%. 1f",($del_time/60));
    $del_time.=" minutes";
} else {
    $del_time.=" seconds";
}
if ($file_upload_time>=60) {
    $file_upload_time=sprintf ("%. 1f",($file_upload_time/60));
    $file_upload_time.=" minutes";
} else {
    $file_upload_time.=" seconds";
}
if ($item_upload_time>=60) {
    $item_upload_time=sprintf ("%. 1f",($item_upload_time/60));
    $item_upload_time.=" minutes";
} else {
    $item_upload_time.=" seconds";
}
print "<br><b>\n<font color=black>Upload complete</b></font>
File Upload Time: $file_upload_time
Delete Old Items: $del_time
Item Upload Time: $item_upload_time
<font color=navy>$count items processed\n$add lines added
$skip_count skipped (errors)</font>";
}
if (!($in{'submit'}=~ /test/i)) {
$mail.="
File Upload Time: $file_upload_time
Delete Old Items: $del_time
Item Upload Time: $item_upload_time
Uploaded : $count
Added : $add
Errors : $skip_count
";
$to = "uploads\@musicstack.com";
$from = $email;
$subject = "--Upload-- $name ($add added, $skip_count errors)";
&mail( );
}
if ($in{'submit'}=~ /test/i) {
print "\n
<font color=green>Make sure the above columns match up to the
proper headings.</font>
If they do not match up, hit <b>Back</b> and correct the
problem by changing the drop down settings.
Any line with <font color=red><b>Red</font></b> in it will
be skipped due to an undefined Format, or missing Artist, Title, or Price.
Once everything is correct, hit <b>Back</b> and click <b>Upload</b> to
begin the actual uploading process.
(Your settings will be automatically saved for future uploads.)
";
exit;
}
print "</pre>";
&update_num_items ($seller);
&seller_genres ($seller);
&index ( );
#!/usr/bin/perl
require ("../lib/server_specific.pl");
require ("$htdocs/lib/global.pl");
```

-continued

```
require ("$htdocs/lib/mysql.pl");
require ("$htdocs/lib/media.pl");
require ("$htdocs/lib/upload_columns.pl");
require "$htdocs/lib/cgi-lib.pl";
require "$htdocs/lib/index.pl";
require "$htdocs/lib/login.pl";
require Text::CSV_XS;
$|=1;
$time1= time ( );
$location="/tmp";
$zz=0;
$limit=500;
get seller id from seller table
$id=&login( );
$seller=0;
$q="select seller,password,name,real_name,email
from seller where seller=$id";
&sql ($q);
&fetch ( );
if (!$seller) {&bad("Seller does not exist."); exit;}
$name=substr ($name,0,18);
$name=&sql_endcode1($name);
Upload the file #######
$cgi_lib::writefiles = "$location";
    $cgi_lib::maxdata = 25000000;
    my (%in, # The form data
    %cgi_cfn,   # The uploaded file(s) client-provided name(s)
    %cgi_ct,    # The uploaded file(s) content-type(s). These are
            # set by the user's browser and may be unreliable
    %cgi_sfn,   # The uploaded file(s) name(s) on the
    server (this machine)
    $ret,       # Return value of the ReadParse call.
    $buf        # Buffer for data read from disk.
    );
    $ret = &ReadParse(\%in,\%cgi_cfn,\%cgi_ct,\%cgi_sfn);
if (!defined $ret) {
    &bad ("Error in upload, try again or contact MusicStack");
} elsif (!$ret) {
    &bad ("Error in upload, try again or contact MusicStack");
}
  $cgi_lib::writefiles = $cgi_lib::writefiles;
  $cgi_lib::maxdata  = $cgi_lib::maxdata;
$time2= time ( );
$name1=$name;
$name1=~ tr/A-Z/a-z/;
$name1=~ tr/a-z0-9/\-/cs;
$name1=~ s/\-+/\-/g;
$name1.=".txt";
rename ("$in{'upfile'}","$location/$name1");
$upfile=&sql_endcode1 ($cgi_cfn{'upfile'});
$d_condition=&sql_endcode1 ($in{'d_condition'});
$d_media=&sql_endcode1 ($in{'d_media'});
$computer=&sql_endcode1 ($in{'computer'});
$mult_amount=&sql_endcode1 ($in{'mult_amount'});
$add_amount=&sql_endcode1 ($in{'add_amount'});
$percent_amount=&sql_endcode1 ($in{'percent_amount'});
$pickup_url=&sql_endcode1 ($in{'pickup_url'});
$pickup_day=&sql_endcode1 ($in{'pickup_day'});
$delim=&sql_endcode1($in{'delim'});
$qual =&sql_endcode1($in{'qual'});
remember all drop down values ($col) and set: value of drop
down=column
$col="";
for ($x=1;$x<50;$x++) {
    $temp="c$x";
    if (!$in{$temp}) {next;} # skip ignore columns
    $col.="$x=$in{$temp},";
    if ($in{$temp}<0) {next;}
        if ($c{"c$in{$temp}"}) {&bad ("Duplicate drop
        down value: <font
color=red>$columns_$in{$temp}}</font><br>Please use this
value only one time.");}
    $c{"c$in{$temp}"}=$x-1; # value of drop down = column number
print "$cont $c$in{$temp} --".($x-1)."<br>";
}
$mm="";
foreach $x (@media) {
    $temp="m$media{$x}";
    if (!$in{$temp}) {next;} # skip ignore columns
    $in{$temp}=~ s/\^//g;
    $in{$temp}=~ s/\|//g;
    $mm.="$media{$x} $in{$temp}|";
    if ($in{$temp}<0) {next;}
}
$mm=&to_sql ($mm);
#print "$cont $mm";exit;
if (!$in{'d_condition'}) {&bad ("Please enter a default condition.");}
if (!$c{'c3'} and !$in{'d_media'})    {&bad
("Please enter a default media type.");} # if format/media not
selected and no default media
if (!defined($c{'c1'})) {&bad ("You must define an artist column.");}
if (!defined($c{'c2'})) {&bad ("You must define a title column.");}
if (!defined($c{'c4'})) {&bad ("You must define a price column.");}
if (length ($upfile)<3 and !$in{'submit'}=~ /export/i)    {&bad
("Please enter an upload file.");}
if ($in{'pickup_url'}=~ /http:VV./) {
        if (!($in{'pickup_url'}=~ /\./)) {&bad
        ("Please enter a vaild URL for database pickup.");}
}
Add the profile to table UPLOAD ######
if (!$test) {$test="0";}
if (!$approved) {$approved="0";}
$temp_seller=$seller;
$seller="";
$q="select seller from upload where seller='$temp_seller'";
&sql ($q);
&fetch ( );
if (!$seller) {
    $seller=$temp_seller;
        $q = "insert into upload
(seller,col,upfile,d_media,d_condition,mult_amount,add_amount,
percent_amount,pickup_url,pickup_day,tested,approved,
last_upload,media_types,computer_type,delimiter,qualifier)
values
($seller,'$col','$upfile','$d_media','$d_condition',
'$mult_amount','$add_amount','$percent_amount',
'$pickup_url','$pickup_day','$tested','$approved',
$date8_,'$mm','$computer','$delim','$qual')";
} else {
    $seller=$temp_seller;
        $q = "update upload set
col='$col';upfile='$upfile',d_media='$d_media',
d_condition='$d_condition',mult_amount='$mult_amount',
add_amount='$add_amount',percent_amount='$percent_amount',
pickup_url='$pickup_url',pickup_day='$pickup_day',
tested='$tested',approved='$approved',last_upload=$date8_,
media_types='$mm',computer_type='$computer',delimiter='$delim',
qualifier='$qual'
where seller=$seller";
}
&sql ($q);
#print "$cont $q";exit;
$seller=$temp_seller;
$in{'mult_amount'}=~ s/[^0-9\.]//g; # only
allow numbers and decimals
$in{'percent_amount'}=~ s/[^0-9\.]//g;
$in{'add_amount'}=~ s/[^0-9\.]//g;
if (!$in{'mult_amount'}) {$in{'mult_amount'}=1;} # set
so equals itself
if (!$in{'mult_amount'}<0) {&bad ("Please enter a valid
multiplying number.");}
if ($in{'percent_amount'} and $in{'percent_amount'}<1) {&bad
("Please enter a valid percent (1% or higher): $in{'percent_amount'}%
is not valid.");}
######### Parse the file ##################
print "$cont<html>
<head>
<title>Seller Upload</title>
<BODY bgcolor=#FFFFDD text=#000000 link=#0000CA vlink=#00458A
alink=#000000
bgcolor=#FFFFFF>
</head>
<pre>
";
$stop=2;
Delete old inventory ####
if ($in{'delete'} eq "del" and !($in{'submit'}=~ /test/i)) {
$del_time1= time ( );
```

-continued

```
        print "<b>Current inventory deleted</b>\n\n";
        $q="update items set show_item=-1
          where seller=$seller and type='s'";
        &sql ($q);
        $del_time2= time ( );
        sleep (7);
}
$mail="Store : $name ($seller)
Real : $real_name
Email : $email
$http/seller/upload.cgi?user=$email&pw=$password\n\n";
set up delimiters ###
if ($delim eq "tab") {$d="\t";}
if ($delim eq "com") {$d=",";}
if ($delim eq "sem") {$d=";";}
if ($delim eq "pip") {$d="|";}
if ($delim eq "das") {$d="-";}
if ($qual eq "dquote") {$q="\"";}
if ($qual eq "squote") {$q="'";}
if ($qual eq "none") {$q="";}
$csv = Text::CSV_XS->new({
              'quote_char' => $q,
              'escape_char' => $q,
              'sep_char' => $d,
              'binary' => 0
              });
$sub[1] =18; #band
$sub[2] =20; #title
$sub[3] =6; #media
$sub[4] =5; #price
$sub[5] =4; #quantity
$sub[6] =8; #label
$sub[7] =10; #release id
$sub[8] =10; #country
$sub[9] =12; #release date
$sub[10]=9; #condition
$sub[11]=10; #genre
$sub[12]=15; #url1
$sub[13]=15; #url2
$sub[14]=30; #descr
$sub[15]=8; #ref
$space=".................................................";
$space="                                                 ";
#create associate array of what users media definitions = musicstack
media defs foreach $temp (@media) {
        $t="m$media{$temp}";
        if (!defined($in{$t})) {$in{$t}=$temp;}
        $in{$t}=~ s/ +,/,/g;
        $in{$t}=~ s/, +/,/g;
        (@|)=split (/,/,$in{$t});
        foreach $a (@|) {
            $a=~ tr/a-z/A-Z/;
            $m{$a}=$temp;
        }
        $temp1=$temp;
        $temp1=~ tr/a-z/A-Z/;
        $m{$temp1}=$temp;
}
set end of line character for Mac/PC ##
if ($computer eq 'mac') {
      $/="\r"; # set EOL char for Mac
} else {
      $/="\n"; # set EOL char for PC
}
open (F,"$location/$name1");
$x=0;
$ok=0;
$count=0;
$skip_count=0;
$done_lines=0
while (<F>) {
  $_=~ s/ +$d/$d/g;
  $_=~ s/$d +/$d/g;
  @lists="";
  $_=~ s/\r//g;
  $_=~ s/\n//g;
  $temp=chr(163); # get rid of pound sign
  $_=~ s/$temp//g;
  if ($delim eq "tab" and $qual eq "none") {
```

```
    (@list)=split (/$d/,$_);
  } else {
    if ($csv->parse($_)) {
        @list = $csv->fields;
    } else {
        $err = $csv->error_input;
        $skip=1;
        print "<font color=red>Invalid text qualifier. Try a different
qualifier setting on the previous page. </font> $err<br>";
        $count++;
        $skip_count++;
        next;
    }
}
#print "$cont $list[0] -- $list[1] -- $list[2] -- $list[3]<br>";
$x=0;
$count++;
$skip="";$skip1="";
foreach $a (@list) {# get rid of surrounding quotes
    $a=~ s/\n//g;
    $a=~ s/\r//g;
    if ($a=~/^ "/ and $a=~ /"\Z/) {
        $a=~ s/^"//;
        $a=~ s/"\Z//;
    }
    $a=~ s/""/"/g;
    $a=~ s/^ +//g;
    $list[$x]=$a;
    $x++;
}
the $XXXX =$list[$c{'cX'}] below must match the
%columns (/lib/upload_columns.pl) exactly

$band        ="";
$title       ="";
$media       ="";
$price       ="";
$quantity    ="";
$label       ="";
$release_id  ="";
$country     ="";
$release_date="";
$condition   ="";
$genre       ="";
$url1        ="";
$url2        ="";
$descr       ="";
$ref         ="";
$band        =$list[$c{'c1'}] if (defined($c{'c1'}));
$title       =$list[$c{'c2'}] if (defined($c{'c2'}));
$media       =$list[$c{'c3'}] if (defined($c{'c3'}));
$price       =$list[$c{'c4'}] if (defined($c{'c4'}));
$quantity    =$list[$c{'c5'}] if (defined($c{'c5'}));
$label       =$list[$c{'c6'}] if (defined($c{'c6'}));
$release_id  =$list[$c{'c7'}] if (defined($c{'c7'}));
$country     =$list[$c{'c8'}] if (defined($c{'c8'}));
$release_date=$list[$c{'c9'}] if (defined($c{'c9'}));
$condition   =$list[$c{'c10'}] if (defined($c{'c10'}));
$genre       =$list[$c{'c11'}] if (defined($c{'c11'}));
$url1        =$list[$c{'c12'}] if (defined($c{'c12'}));
$url2        =$list[$c{'c13'}] if (defined($c{'c13'}));
$descr       =$list[$c{'c14'}] if (defined($c{'c14'}));
$ref         =$list[$c{'c15'}] if (defined($c{'c15'}));
Do Math Operations On Price ####
if ($list[$c{'c4'}]=~ /,..\Z/) {# convert 9,22-->9.22 for Total Recall
    $list[$c{'c4'}]=~ s/,(..)\Z/.$1/;
}
# add in PROMO issue for vinyl vendors
if ($list[$c{'c14'}]!~ /stock/i and $seller==1805) {
    $list[$c{'c14'}]="Promo Issue/$list[$c{'c14'}]";
}
$list[$c{'c4'}]=~ s/[^0-9\.]//g; # get
rid of extrainious stuff ($, &, etc.)
if ($list[$c{'c4'}]>0) {
    $list[$c{'c4'}]=$list[$c{'c4'}]*$in{'mult_amount'}
    if ($in{'mult_amount'}>0);
    $list[$c{'c4'}]=$list[$c{'c4'}]+($list[$c{'c4'}]*
    $in{'percent_amount'}/100);
    $list[$c{'c4'}]=$list[$c{'c4'}]+$in{'add_amount'};
```

-continued

```
}
Real Insert ###
$temp=$count;
if ($count==1 or !($temp%=20) and !$test) {
    $u=0;
    if ($count==1) {
        if (!($in{'submit'}=~ /test/i)) {
            print "<font color=navy>Uploading new inventory . . .
            <br><br></font>";
        }
    }
}
Print Header #########
print "\n";
foreach $aa (@columns) {
    $u++;
    $temp="col$u";
    $temp1="c$u";
    if ($c{$temp1} eq "") {next;}
    $aa=substr ("$aa$space",0,$sub[$u])." ";
    $aa=~ s/Artist V B /Artist   /;
    if ($list[$in{$temp}]) {print "<b>$aa</b>";}
}
print "\n";
}
#######################################
Do for every item in each row ####
#######################################
$u=0;
$skip="";
foreach $aa (@columns) {
# catinate first name and last from separate column to create one column
# for recordsbymail.com
if ($seller==1535 and $list[2]) {
    $list[3]="$list[2] $list[3]";$list[2]=""; # becomes: Howard Jones
}
    $u++;
    $temp="c$u";
    $item=$list[$c{$temp}];
    $item=~ s/\n//;
    $item=~ s/\r//;
    $item=~ s/\r//;
if(!$item and $u==1) {$item='Artist Not Listed';$skip=1;}
if (!defined($c{$temp})) {next;} # skip column not defined in drop down
if ($u==10) {# set default condition if none assigned
    if (!$item) {$item=$in{'d_condition'};}
}
if ($u==3) {# do default media if none assigned
if (!defined($media_col)) {# if media ever exists don't allow media
    type fill in
    if ($item) {$media_col=1;} # yes, they have a media column
    if (!defined($item)) {$item=$in{'d_media'};} # set media to default
}
    $item_old=$item;
    $item=~ tr/a-z/A-Z/;
    $item=$m{$item};
    $item1=$item;
    if (!$item) {$item="???";$item1="???";$skip=1;} else
    {$media=$item;}
}
    if ($c{$temp} eq "") {next;}
    if ($u==1 and !$item)  {next;} #$item="????";$skip=1;} # band
    if ($u==2 and !$item)  {$item=$band;} #"????";$skip=1;} # title
    if ($u==10 and !$item) {$item=$in{'d_condition'};} # condition
    if ($u==5 and !$item)  {$quanity=1;$item=1;} # set default quanity
    if ($u==5) {$item=~s/[ 0-9]//g;$quanity=$item;}
    if ($item>99) {$item=99;}
    if ($u==4) {$item=~s/[ 0-9\.]//g;$price=$item;} # clean up price
    if ($u==4 and $item<=.01) {$item="????";$skip=1;} # price
    if ($u==1) {#clean up band(no all caps, no 2x spaces,
    or weird 1st chars)
        $item=~ s/ +/ /g;
        $item=~ s/^[ a-zA-Z0-9]+//g;
        if ($item!~ /^the the\/Z/) { # don't do it for the band THE THE
        $item=~ s/^the //gi;
        }
        $item=~ s/ +/ /g;
        $item=~ s/^ +//g;
        $item=~ s/ \Z//g;
        $item=~ s/ ,/,/g;
```

```
        $item=~ s/, /,/g;
        $item=~ s/^ a //g;
        $item=~ s/,the\Z//i;
        $item=~ s/,a\Z//i;
        $item=&cap ($item);
        $band=$item;
    }
    if ($u==2) { #clean up title (no all caps, no 2x spaces,
    or weird 1st chars)
        $item=~ s/ +/ /g;
        $item=~ s/^[ a-zA-Z0-9]+//g;
        $item=&cap ($item);
        $title=$item;
    }
    $item=~ s/\<.*\>//g; # don't allow HTML in display output
    $item=~ s/\</\</g; # don't allow < to mess up output
    $item=~ s/\>/\>/g; # don't allow > to mess up output
    $item=substr ("$item$space",0,$sub[$u])." ";
    if ($u==3) {if (!$item1)
    {$item=substr ("$item_old$space",0,$sub[$u])." ";$skip=1;}}
if ($skip and !$skip1) {$item = "<font
color=red><b>$item</b></font>";$skip1=1;$skip_count++;}
if ($in{'submit'}=~ /test/i and $skip_count>9) {next;}
print "$item";
if ($in{'submit'}=~ /test/i and $count>6 and !$skip) {$test=1;next;}
if ($count==$stop) {
    $aa=substr ("$aa   ",0,10);$mail.="$aa : $item\n";$stop_flag=1;}
$temp="";
}
print "\n";# if ($skip_count<10);
$media=~ tr/a-z/A-Z/;
$media=$media{$m{$media}};
if (!defined($media)) {$media=$in{'d_media'};} # use
default MEDIA if no MEDIA given
if (!defined($media)) {$skip=1;}
if ($skip) {next;}
if (!($in{'submit'}=~ /test/i)) {
#$q="SELECT MAX(item) from $items_table";
#&sql ($q);
&fetch ( );
#$num=$row[0]+1;
$num="NULL"; # so that auto_increment will work
if (!$quanity) {$quanity=1;}
Make varible SQL friendly ###
$price=~ s/\$//g;
$price=~ s/[^ 0-9\.]//g;
$quanity=~ s/[^ 0-9]//g;
foreach {split
(/,/,"band,title,label,ref,release_id,release_date,genre,country,condition,
url1,url2,descr,price,media,quanity"))
{${$_}=&to_sql (${$_});}
$descr=~ s/\<br\>/\r/gi;
if ($zz==0) {
    $q = "INSERT INTO $items_table (";
    $q.= "item,seller,band,title,media,price,quanity,label,release_id,";
    $q.= "genre2,date,country,condition,url,url1,descr,";
    $q.= "show_item,item_date,first_date,type,tracking,seller_name";
    $q.= ") VALUES";
}
if ($zz>0) {
    $q.=",";
}
$q.= "($num,$seller,'$band','$title',$media,$price,$quanity,";
$q.= "'$label','$release_id','$genre','$release_date',";
$q.= "'$country','$condition','$url1','$url2','$descr',2,";
$q.= "'$cdate','$cdate','s','$ref','$name')";
$zz++;

if ($zz >=$limit) {
    $zz=0;
# print "$q<br>";
    &sql ($q);
}
if ($stop_flag) {$mail.="\n";$stop_flag="";$stop=$stop*2;} # so
it mails out 2 X rows
}
}
if ($test) {
    print "<br><b>.<br>.<br></b>";
```

```
} else {
if ($zz>0) {
    &sql ($q); # flush out insert buffer
}
$time3= time ( );
    $add=$count-$skip_count;
$file_upload_time=$time2-$time1;
$item_upload_time=$time3-$time2;
$del_time=$del_time2-$del_time1;
if ($del_time>=60) {
    $del_time=sprintf ("%. 1f",($del_time/60));
    $del_time.=" minutes";
} else {
    $del_time.=" seconds";
}
if ($file_upload_time>=60) {
    $file_upload_time=sprintf ("%. 1f",($file_upload_time/60));
    $file_upload_time.=" minutes";
} else {
    $file_upload_time.=" seconds";
}
if ($item_upload_time>=60) {
    $item_upload_time=sprintf ("%. 1f",($item_upload_time/60));
    $item_upload_time.=" minutes";
} else {
    $item_upload_time.=" seconds";
}
print "<br><b>\n<font color=black>Upload complete</b></font>
File Upload Time: $file_upload_time
Delete Old Items: $del_time
Item Upload Time: $item_upload_time
<font color=navy>$count items processed\n$add lines added
$skip_count skipped (errors)</font>";
}
if (!($in{'submit'}=~ /test/i)) {
$mail.="
File Upload Time: $file_upload_time
Delete Old Items: $del_time
Item Upload Time: $item_upload_time
Uploaded : $count
Added   : $add
Errors  : $skip_count
";
$to      = "uploads\@musicstack.com";
$from    = $email;
$subject = "--Upload-- $name ($add added, $skip_count errors)";
&mail( );
}
if ($in{'submit'}=~ /test/i) {
print "\n
<font color=green>Make sure the above columns match
up to the proper headings.</font>
If they do not match up, hit <b>Back</b> and correct the problem
by changing the drop down settings.
Any line with <font color=red><b>Red</b></font> in
it will be skipped due
to an undefined Format, or missing Artist, Title, or Price.
Once everything is correct, hit <b>Back</b> and click <b>Upload</b> to
begin the actual uploading process.
(Your settings will be automatically saved for future uploads.)
";
exit;
}
print "</pre>";
&update_num_items ($seller);
&seller_genres ($seller);
&index ( );
```

An alternate embodiment of the upload processing program in PERL language, which is generalized for uploading and processing more general databases, is as follows:

```
#####################################################
# File: Config                                      #
# Sample Configuration File                         #
# This file is stored on the server and is set up by #
# the administrator to allow for maximum flexibility #
# of the upload program                             #
#####################################################
#Column Def    Times    Characters   DB column    DB Col Preview              Requird
#Definition   Allowed                Allowed      name         Type           Width
Column
Band          1         all          band         char         20             y
Title         1         all          title        char         20             y
Price         1         price        price        num          10             y
Media         1         all          media        char         10             n
Condition     1         all          condition    char         15             n
URL           2         all          url          char         20             n
Reference     1         num          ref          char         20             n
Description   1         all          descr        char         20             n
# number of drop downs that will be displayed on the upload setup screen
drop downs=7
# set show preview to zero if you want no preview, else the preview header
# will be shown every X number of lines
show preview=20
# the below emails are for the summary reports after each upload
# leave blank if you want no summary reports sent
summary email=dstack@www5.musicstack.com
################################################################
Database table layout used to store each users upload profile ##
This layout should be setup as a database table before        ##
programs are used                                             ##
################################################################
# id length can be tailored to the length you need for your primary key
create table upload_config (
id          varchar(60) not null,
config_values blob
);
#this command will create an index on the above table using ID as the key
after table upload_config add index id_index (id);
```

-continued

```
##########################################################################
Template File: upload.htx                     ##
Upload Template Screen - Variables get filled in from CGI scripts ##
##########################################################################
<html>
<title>File Upload</title>
<head></head>
<body>
<form method='POST' enctype='multipart/form-data' action='upload.cgi' name=form>
<font size=+2 color=navy face=arial><b>File Upload</b></font>
<br>
<br>
<!-- File Upload Box -->
<table width=550 border=1 cellpadding=6><tr><td bgcolor=#FFFFEE>
<font size=+1><b>Select the file to upload</b></font>
<br>
<font color=green>#upfile#</font><br>
<input type=file name=upfile size=50 maxlength=200>
<br><br>
<font size=-1>If you don't see a BROWSE button above, your browser doesn't support file
upload.<br>
In this case, upgrade to a current version of Netscape or Internet Explorer.</font><br>
<br>
<input type=submit name=submit value="Upload">
</td></tr>
</table>
</form>
</body>
</html>
##########################################################################

Template File: Setup.htx                       ##
Upload Profile Setup Template - Variables get filled in by CGI scripts ##
##########################################################################

<html>
<title>Upload Setup</title>
<head></head>
<body>
<form method='POST' action='process_setup.cgi' name=setup>
<font size=+2 color=navy face=arial><b>Upload Setup</b></font>
<br><br>
<table width=550 border=1 cellpadding=6><tr><td bgcolor=#FFFFEE colspan=2>
<table border=0 cellspacing=0 cellpadding=0>
<tr><td colspan=2><font size=+1>
<b>Define your database/spreadsheet columns</b></font>
</td></tr>
#col#
<tr>
<td align=left><font size=+1><br><b>Computer Type</b></font>   </td>
<td>
<br>
<select name=computer_types>
#computer_types#
</select>
</td>
</tr>
<tr><td align=left><font size=+1><b>File Type</b></font></td>
<td>
<select name=file_types>
#file_types#
</select>
</td></tr>
<tr><td align=left><font size=+1><b>Text Qualifier</b></font><br></td>
<td valign=top>
<select name=qualifiers>
#qualifiers#
</select>
</td></tr>
</table>
<br>
<input type=hidden name=num_col value=#num_col#>
<input type=submit name=submit value="Update">
</td></tr>
</table>
</form>
</body>
</html>
##########################################################################
```

-continued

```

File Setup.cgi                                        ##
Read Config file and create drop downs. Then render setup.htx template ##
###############################################################

#!/usr/bin/perl
require ("global.pl"); # global variables and global subroutines
require ("mysql.pl"); # SQL routines for database interface / calls
# hard coded user ID
# Should be gathered from login authorization
$id=3;
&ReadParse ();
&read_config ("$htdocs/config"); # get configuration values
&get_config_values ($id); # config values returned in %col
print "$cont ";
# create drop down on set up screen from configuration values
$col="";
for ($x=1;$x<=$num_col;$x++){
    $col.="\n\n<tr><td>Column".chr(64+$x)." </td><td>\n";
    $col.="<select name=\"c$x\">\n";
    $col.="<OPTION value=\"-1\"> --- Do Not Use ---".chr(10);
    foreach $a (@columns) {#do loop for each possible drop down values
    $temp="c$x";
    # if value is same as stored values make 'selected' as to remember value
    if ($a eq $col{$temp}) {$sel="selected";}else {$sel="";}
    $col.="<OPTION value=\"$a\" $sel>$a\n";
    }
    $col.="</select>\n</td></tr>";
}
create drop down for computer type
$computer_types="";
foreach (@computer_types) {
    if ($_ eq $col{'computer_types'}) {$sel="selected";}else {$sel="";}
    $computer_types.="<option value=\"$_\" $sel>$_\n";
}
create drop down for file type
$file_types="";
foreach (@file_types) {
    if ($_ eq $col{'file_types'}) {$sel="selected";}else {$sel="";}
    $file_types.="<option value=\"$_\" $sel>$_\n";
}
create drop down for qualifier
$qualifiers="";
foreach (@qualifiers) {
    if ($_ eq $col{'qualifiers'}) {$sel="selected";}else {$sel="";}
    $qualifiers.="<option value=\"$_\" $sel>$_\n";
}
&template ("setup.htx");
###############################################################
# File: Process_setup.cgi                                  ##
# Takes values from setup.htx and stores Upload Profile and shows ##
# actual upload screen where database file can be uploaded      ##
###############################################################
#!/usr/bin/perl
require ("global.pl"); # global variables and global subroutines
require ("mysql.pl"); # SQL routines for database interface / calls
# hard coded user ID
# Should be gathered from login authorization
$id=3;
&ReadParse ();
if ($in{'submit'}) {# there is data coming from Upload Setup screen
&read_config ("$htdocs/config"); # get configuration values
$num_col=$in{'num_col'};
###############################################################
gather setup values from input fields. put into delimited string
###############################################################
$col="";
@count="";
# create delimited string of all set up values
$delimiter="|";
for ($x=1;$x<=$num_col;$x++){
    $temp="c$x";
    $col.="c$x=$in{$temp}$delimiter"; # c#=CONFIG_TYPE$delimiter
    if ($in{$temp}==-1) {next;}# if 'Do Not Use' go to next
    $count{$in{$temp}}++; # count each time a scheme field is used
    # only allow a scheme field to be used a certain number of times
    # this value ($times[$type{$in{$temp}}]) is defined in the config file
    if ($count{$in{$temp}}> $times[$type{$in{$temp}}])
    {
```

-continued

```
    # take care of pluralization
    if ($times[$type{$in{$temp}}]==1) {$s="";}else {$s="s";}
        &bad ("Duplicate drop down value: <font color=red>$in{$temp}</font><br>This value can
only be used $times[$type{$in{$temp}}] time$s");}
    }
$col.="computer_types=$in{'computer_types'}$delimiter";
$col.="file_types=$in{'file_types'}$delimiter";
$col.="qualifiers=$in{'qualifiers'}";
###############################################################
# store gathered configuration information in database table
###############################################################
# erase old if any to make room for new info
$q="delete from upload_config where id='$id'";
&sql ($q);
# add new info the configuration table
$q="insert into upload_config (id,config_values) values ('$id','$col')";
&sql ($q);
}
##########################
show File Upload screen
##########################
print "$cont";
&template ("upload.htx");
###############################################################
# File: Upload.cgi                                           ##
# This program reads in the upload profile located on server ##
# and uploads, parses and column maps the database from client side. ##
# Syntax checking rules laid out in Config file are followed.    ##
# Items that do not have proper syntax are flagged as improper when ##
# upload feedback is presented on the screen during parsing.       ##
# These columns are not inserted into the centralized database.    ##
# Columns that pass syntax                                    ##
# checking are inserted into the centralized database. Stats are ##
# kept on columns and rows that are parsed. Upload time is also    ##
# kept track of.                                              ##
# These stats and times are displayed after all rows have been    ##
# parsed and information is inserted into the central database.   ##
# The summary information is also emailed to an                ##
# administrator if that option was selected in the Config file    ##
###############################################################
#!/usr/bin/perl
require ("global.pl"); # global variables and global subroutines
require ("mysql.pl"); # SQL routines for database interface / calls
require Text::CSV_XS; # common routine for parsing text delimited strings
use CGI; # commom routine used for file uploading from browser to server
# hard coded user ID
# Should be gathered from login authorization
$id=3;
$error=0;
$ok=0;
$line_count=0;
$stop=1; # counter for line item samples. will grow as 2 ^ X
$space="                                                                  ";
&read_config ("config"); # get configuration values
&get_config_values ($id); # return config values in %col
$time1=time ();
###############################################################
Upload the file from browser and store in /tmp/$name #######
###############################################################
$r=new CGI;
$name=$id;
$name=~ tr/A-Z/a-z/;
$name=~ s/[ ^0-9a-z]//g;
$name.=".txt"; # add .txt extension
$out_file="/tmp/$name";
$filename =$r->param('upfile');
open (OUTFILE,">$out_file");
while ($bytesread=read($filename,$buffer,1024)) {
        print OUTFILE $buffer;
}
close $filename;
close (OUTFILE);
$time2=time ();
# Set delimiter and qualifer
if ($col{'file_types'}=~/ ^tab/i)    {$delim="\t";}
if ($col{'file_types'}=~/ ^comma/i) {$delim=",";}
if ($col{'file_types'}=~/ ^semi/i)  {$delim=";";}
if ($col{'file_types'}=~/ ^pipe/i)  {$delim="\|";}
if ($col{'file_types'}=~/ ^dash/i)  {$delim="-";}
```

-continued

```
if ($col{'qualifiers'}=~/double/i) {$qual="\"";}
if ($col{'qualifiers'}=~/single/i) {$qual="'\'";}
if ($col{'qualifiers'}=~/none/i) {$qual="";}
$csv = Text::CSV_XS->new({
'quote_char' => $qual,
'escape_char' => $qual,
'sep_char'   => $delim,
'binary'     => 0
});
####################################
# open uploaded file for parsing #
####################################
open (FILE,"$out_file");
print "$cont<pre>";
while (<FILE>){
        $_=~ s/\r\Z//g; # get rid of line trailing CR if any
        $_=~ s/\n\Z//g; # get rid of line trailing LF if any
        $_=~ s/(\r\n)\Z//g; # get rid of line trailing CR/LF combos if any
        $_=~ s/(\n\r)\Z//g; # get rid of line trailing LF/CR combos if any
        if ($delim eq "\t" and $qual=~/none/i) {
                (@list)=split (/\t/,$_); # don't use CSV routine
        }else {# use CSV routine
                if ($csv->parse($_)) {
                        @list = $csv->fields;
                }else {
                        $err = $csv->error_input;
                        $skip=1;
                        print "<font color=red>Invalid text qualifier</font>";
                }
        }
        # get header and use preview_width set in CONFIG file
        $x=0;
        $header="";
        foreach (@list) {
                $x++;
                $temp="c$x";
                $item="$col{$temp}$space";
                if ($item == -1) {next;}# do not use row
        $item=substr($item,0,$preview_width[$type{$col{$temp}}]);
                $header.="<b>$item</b>"; # add extra space after each Col Heading
        }
        $x=0;
                if (($line_count>=$show_preview or $line_count==0) and $show_preview) {
                $line_count=0;
                        print "$header\n";
                }
                $sql_left="";
                $sql_right="";
                # parse a row
                foreach $column_value (@list) {
                        $column_value=~ s/ \Z//g;
                                $column_value=~ s/\n\Z//g;
                                $column_value=~ s/\r\Z//g;
                                $x++;
                                $temp="c$x";
                                $item="$col{$temp}"; # column name from drop down
                                if ($item== -1) {next;}# do not use row
                        # Syntax Checking Below #
                                # if column value is empty and a required column, mark flag
                                if ($required[$type{$col{$temp}}]=~/y/) {
                                        if (length($column_value)<1) {$column_value="???";$skip=1;}
                                }
                                # only allow prices
                                if ($allowed[$type{$col{$temp}}]=~/price/i) {
                                        if ($column_value=~/[^0-9\.\;\,\$]/) {$column_value="???";$skip=1;}
                                }
                                # only allow numbers
                                if ($allowed[$type{$col{$temp}}]=~/num/i) {
                                        if ($column_value=~/[^0-9\.\,]/) {$column_value="???";$skip=1;}
                                }
                                # only allow integers
                                if ($allowed[$type{$col{$temp}}]=~/int/i) {
                                        if ($column_value=~/[^0-9\,]/) {$column_value="???";$skip=1;}
                                }
                                # only allow character
                                if ($allowed[$type{$col{$temp}}]=~/char/i) {
                                        if ($column_value=~/[^a-zA-Z]/) {$column_value="???";$skip=1;}
                                }
                                $item="$column_value$space";
```

-continued

```
                    $item=substr($item,0,$preview_width[$type{$col{$temp}}]);
                    if ($skip==1) {$item="<font color=red>$item</font>";$skip++;}
                    # for email summary report
                    if ($line_count==$stop) {
                            $items.=substr ("$columns[$type{$col{$temp}}]$space",0,12)."
$column_value\n";
                    }
                    $sql_left.="$col_name[$type{$col{$temp}}],"; # DB column name
                    # if character add single quote, else add nothing
                    $quote="'"; # default value for SQL statement; use single quote
                    if ($col_type[$type{$col{$temp}}]=~/num|int/i)
                        {
                            $quote=""; # use not single quote in SQL statement
                            $column_value=~s/[ ^ 0-9\.]//g; # allow only legal characters
                            if (!$column_value) {$column_value=0;}# so SQL doesn't choke
                            if ($col_type[$type{$col{$temp}}]=~/int/i) {
                                $column_value=int($column_value); # chop off any decimals
                            }
                        }
                    $sql_right.="$quote$column_value$quote,";
                    if ($show_preview) {
                        print "$item";# extra space left in so columns don't butt up
                    }
                }
                if ($line_count==$stop) {
                    $stop=$stop*2; # do only on 2 ^ X
                    $items.="\n";
            }
                chop ($sql_left);    # get rid of unneeded comma
                chop ($sql_right); # get rid of unneeded comma
                if ($show_preview) {
                    print "\n"; # do after each line of preview
            }
                if ($skip)
                {$skip="";$error++;}
                else
                    {
                        $ok++;
#######################################################################

Do SQL insert
#######################################################################

                        $q="insert into table (id,$sql_left) value ($id,$sql_right)\n\n";
                        &sql ($q);
            }
                $line_count++;
} # end while each line loop
$time3= time ();
$file_upload_time=$time2-$time1;
$item_upload_time=$time3-$time2;
if ($file_upload_time>=60) {
    $file_upload_time=sprintf ("%.1f",($file_upload_time/60));
    $file_upload_time.=" minutes";
}else {
    $file_upload_time.="seconds";
}
if ($item_upload_time>=60) {
    $item_upload_time=sprintf ("%.1f",($item_upload_time/60));
    $item_upload_time.=" minutes";
}else {
    $item_upload_time.=" seconds";
}
###################
show summary page
###################
$total=$error+$ok;
if ($total==1) {$s1="";}else {$s1="s";}
if ($ok ==1) {$s2="";}else {$s2="s";}
if ($error==1) {$s3="";}else {$s3="s";}
$out="
<b>Upload Complete</b>
File Uploading Time : $file_upload_time
Database Insert Time: $item_upload_time
$total line$s1 processed
$ok line$s2 added
$error line$s3 skipped due to errors
";
print $out;
```

```
#########################
send out summary email
#########################
$out="File Uploading Time : $file_upload_time
Database Insert Time: $item_upload_time
$total line$s1 processed
$ok line$s2 added
$error line$s3 skipped due to errors
Uploaded Data Sample
====================";
if ($summary_email=~/\@/) {# send out summary if email given
    $to      = $summary_email;
    $from    = $admin_email;
    $subject = "Upload Summary Report";
    $mail="$out\n\n$items\n";
    &mail ();
}
close (FILE);
##########################################################
# File: Global.pl                                         #
# Global variables declared along with global subroutines #
##########################################################
$http       = "http://www.musicstack.com";
$mailprg    = "/usr/bin/sendmail";
$date_cmd   = "/bin/date";
$cont="Content-type: text/html\n\n";
# arrays for drop downs of possible choices
@computer_types=('PC','MAC');
#file_types=(
'Tab Delimited',
'Comma Delimited',
'Semicolon Delimited',
'Pipe Delimited',
'Dash Delimited'
);
@qualifiers=('Double Quote','Single Quote','None');
sub template {# renders template files (ie, fills variables)
# set $_[1] to something to parse a variable
if ($_[0] and !$_[1]) {open (FILO,"$_[0]");}
if ($srt_) {print "$srt_";$srt_="";}
if (!$_[1]) {
    while (<FILO>) {
        if (s/#stop#//i) {print "$'";$srt_=$';last;}
        while (/#([a-ZA-Z0-9_\$]+)#/g) {
            $temp=$1;
            if ($temp=~/^\$/) {$temp=~s/^\$//;$_=~s/#\$$temp#/$in{$temp}/g;}
            else {$_=~s/#$1#/${$temp}/g;}
        }
        print "$_";
    }
}else {
    # template replace for a variable;
    $_=$_[0];
    while (/#([a-ZA-Z0-9_\$]+)#/g) {
        $temp=$1;
        if ($temp=~/^\$/) {$temp=~s/^\$//;$_=~s/#\$$temp#/$in{$temp}/g;}
        else {$_=~s/#$1#/${$temp}/g;}
    }
    print "$_";
}
}
sub ReadParse {
        if (@_) {
                local (*in) = @_;
        }
        local ($i, $loc, $key, $val);
    # Read in text
        if ($ENV{'REQUEST_METHOD'}eq "GET") {
            $in = $ENV{'QUERY_STRING'};
        }elsif ($ENV{'REQUEST_METHOD'}eq "POST") {
            for ($i = 0; $i < $ENV{'CONTENT_LENGTH'}; $i++) {
                $in .= getc;
            }
        }
        @in = split(/&/,$in);
        foreach $i (0 .. $#in) {
        # Convert plus's to spaces
            $in[$i] =~ s/\+//g;
        # Convert %XX from hex numbers to alphanumeric
```

```perl
            $in[$i] =~ s/%(..)/pack("c",hex($1))/ge;
        # Split into key and value.
            $loc = index($in[$i],"=");
            $key = substr($in[$i],0,$loc);
            $val = substr($in[$i],$loc+1);
            $in{$key}.= "\0" if (defined($in{$key})); # \0 is the multiple separator
            $in{$key}.= $val;
        }
        return 1; # just for fun
}
sub bad {
    print "$cont
    <br><font size=+1 face=arial>$_[0]</font>";
    exit;
}
sub ok {
    print "$cont
    <br><font size=+1 face=arial>$_[0]</font>";
    exit;
}
########## Send E-mail #############
sub mail {
    open( MAIL, "|$mailprg -t") || die "Can't open $mailprog!\n";
    print MAIL "To: $to\n";
    print MAIL "From: $from\n";
    print MAIL "Return-Path: $from\n";
    print MAIL "Subject: $subject\n\n";
    print MAIL "$mail";
    return (1);
}
sub read_config {
##################################
# read in upload configuration file
##################################
#    useful    returned    global    values:
$num_col,@columns,@times,@allowed,@col_name,@col_type,@preview_width
# @computer,@file_types,@qualifiers
    local ($x);
    open (FILE,"$_[0]");
    $x=0;
    while (<FILE>) {
        $_=~ s/\r//; # strip out C/R character
        $_=~ s/\n//; # strip out New Line character
        if ($_=~ /^#/) {next;}     # skip comments
        if ($_!~ /[0-9a-zA-Z]/) {next;}# skip lines with no characters/numbers
        # extract number of database columns allowed
        if ($_=~ /drop.downs= */i) {$_=~ s/[ ^0-9]//g;$num_col     =$_;next;}
        if ($_=~ /show.preview= */i) {$_=~ s/[ ^0-9]//g;$show_preview =$_;next;}
        if ($_=~ /summary email= */i) {$summary_email =$';next;}
        $_=~ s/ +/\t/g; # convert multiple spaces to tabs
        $_=~ s/\t+/\t/g; # convert multiple tabs to one tab so line is delimited
        # create array of config variables
        ($columns[$x],$times[$x],$allowed[$x],$col_name[$x],$col_type[$x],$preview_width[$x],$required[$x])=split (/\t/,$_);
        $type{$columns[$x]}=$x; # store look up number by scheme type
        $x++;
    }
}
########################################
# recall config_values in delimted format
########################################
sub get_config_values {
# input value = ID
# output %col
    local ($q,@list,$col_num,$value,$config_values);
    $q="select config_values from upload_config where id='$_[0]'";
    &sql ($q);
    #print "$cont $q";exit;
    &fetch ();
    (@list)=split (/\|/,$config_values);
    foreach $a (@list) {
        ($col_num,$value)=split (/=/,$a);
        $col{$col_num}=$value;
        #print "$cont col_num=$col_num, value=$value<br>\n";
    }
}
1:
############################
# File MySQL.pl       #
```

-continued

```
# Database Calls and Routines #
################################
# MySQL Verson 2
use DBI;
&sql_connect ($dbhost,$db,$sql_user,$sql_password);
{${$_}=&to_sql (${$_});}
sub to_sql
{
    local ( $value ) = $_[0];
    $value =~ s/\\/\\\\/g;
    $value =~ s/%/\%/g;
    $value =~ s/_/\_/g;
    $value =~ s/'/\'/g;
    return $value;
}
sub sql_connect
{
    local ($myhost)   = @_[0];
    local ($database) = @_[1];
    local ($user)     = @_[2];
    local ($password) = @_[3];
    $dbh=DBI->connect("DBI:mysql:database=$database",$user,$password);
}
sub sql
{
    $q = @_[0];
    if ($q=~ /select/i) {
        $sth = $dbh->prepare($q) or &bad_sql ($q);
        $sth->execute;
    }else {
        $sth = $dbh->do($q);
    }
}
sub fetch
{
    local ($temp,$temp1,$x);
    if (!$_[0]) {$_[0]=$q;}
    @row = $sth->fetchrow;
    $temp=$_[0];
    $temp=~ s/select +//gi;
    $temp=~ / +from/i;
    @select=split (/,/,$`);
    $x=0;
    foreach $temp (@select) {
        if ($temp=~ /\((.*)\)/i )
            {$temp1=$`;$temp1=~ tr/A-Z/a-z/;}# MAX(seller)--->max
                if ($temp=~ /\(/) {$temp=$`;$temp=~ tr/a-zA-Z0-9\._/-/cs;
                                   $temp=~ s/-//g;}# MAX(seller)-->seller
                if ($temp=~ /\./) {$temp= $`;}      # seller.name-->name
            ${$temp}=$row[$x];
        ${$temp1}=$row[$x] if ($temp1);
            $x++;
            $temp1="";
    }
    return (@row);
}
1;
```

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. A method for uploading database files of varying format and data organization from a client computer to a server computer for storage within a centralized database having a predetermined fixed format and data organization, the method comprising:

configuring a database information profile for transfer to the server computer, said database information profile containing information on the format and data organization of the database file;

performing a test upload of the database information profile and the database file;

receiving success feedback in response to the test upload;

in response to the test upload feedback, one of (i) reconfiguring the database information profile to correct errors in the database information profile; and (ii) transmitting the database information profile and the database file to the server computer for processing and storage within the centralized database.

2. The method as set forth in claim 1, wherein the database information profile includes:

file format of the database file;

column ordering of the database file;

column definitions of the database file; and database column manipulation settings for the database file.

3. The method as set forth in claim 1, further comprising:

upon transmitting the database file to the server computer for processing and storage within the centralized database, receiving an upload feedback summary, said summary including data relating to at least one of (i) number of items within the database processed; (ii) number of uploaded lines; (iii) number of uploaded line syntax errors; and (iv) upload and processing time statistics.

4. The method as set forth in claim 1, wherein upon successful transmission of the database file and the database information profile to the server computer, data within the database file is parsed and mapped into corresponding predetermined columns within the centralized database.

5. A database upload processing program for use in a computer system in which databases having various formats and data organization are uploaded from a peripheral computer to a server computer for storage in a centralized database having a fixed format and data organization, the upload processing program including:

- means for receiving a database information profile from the peripheral computer, said database information profile containing information related to the format and data organization of the database to be uploaded;
- means for performing a test upload of the database information profile and the database;
- means for providing test upload feedback to the peripheral computer;
- means for uploading the database information profile and the database to the server computer;
- means for parsing data within the uploaded database; and
- means for manipulating and mapping the parsed data into corresponding predetermined columns within the centralized database, said parsed data being organized according to the fixed format and data organization of the centralized database.

* * * * *